(12) United States Patent
Achi et al.

(10) Patent No.: US 11,035,994 B2
(45) Date of Patent: Jun. 15, 2021

(54) LIGHT-EMITTING MODULE

(71) Applicant: NICHIA CORPORATION, Anan (JP)

(72) Inventors: Yusaku Achi, Tokushima (JP); Toshiaki Moriwaki, Itano-gun (JP); Ryohei Yamashita, Tokushima (JP)

(73) Assignee: NICHIA CORPORATION, Anan (JP)

( * ) Notice: Subject to any disclaimer, the term of this patent is extended or adjusted under 35 U.S.C. 154(b) by 0 days.

(21) Appl. No.: 16/726,300

(22) Filed: Dec. 24, 2019

(65) Prior Publication Data

US 2020/0209461 A1 Jul. 2, 2020

(30) Foreign Application Priority Data

Dec. 27, 2018 (JP) .............................. JP2018-245673

(51) Int. Cl.
*F21V 8/00* (2006.01)

(52) U.S. Cl.
CPC ........... *G02B 6/0045* (2013.01); *G02B 6/005* (2013.01); *G02B 6/0038* (2013.01); *G02B 6/0043* (2013.01); *G02B 6/0055* (2013.01); *G02B 6/0068* (2013.01)

(58) Field of Classification Search
CPC ... G02B 6/0038; G02B 6/0016; G02B 6/0068
See application file for complete search history.

(56) References Cited

U.S. PATENT DOCUMENTS

| | | | |
|---|---|---|---|
| 2009/0086508 A1* | 4/2009 | Bierhuizen | G02B 6/0021 362/617 |
| 2010/0002169 A1 | 1/2010 | Kuramitsu et al. | |
| 2010/0118545 A1 | 5/2010 | Ijzerman et al. | |
| 2010/0253882 A1 | 10/2010 | Han et al. | |
| 2011/0013421 A1 | 1/2011 | Um | |
| 2012/0013811 A1 | 1/2012 | Shimizu | |
| 2018/0212128 A1 | 7/2018 | Hayashi | |
| 2018/0239193 A1 | 8/2018 | Hayashi | |
| 2019/0227382 A1* | 7/2019 | Watanabe | F21V 5/04 |
| 2020/0049876 A1* | 2/2020 | Watanabe | G02F 1/133603 |
| 2020/0049877 A1* | 2/2020 | Watanabe | G02B 6/0025 |

FOREIGN PATENT DOCUMENTS

| | | | |
|---|---|---|---|
| JP | 2005038776 A | 2/2005 | |
| JP | 2005122953 A | 5/2005 | |
| JP | 2008027740 A | 2/2008 | |

(Continued)

*Primary Examiner* — William N Harris
(74) *Attorney, Agent, or Firm* — Hunton Andrews Kurth LLP

(57) ABSTRACT

A light-emitting module includes: a light guide plate having a first surface on which a plurality of first recesses arranged in rows and columns and a grid-shaped groove portion surrounding each of the plurality of first recesses are provided, and a second surface located on the opposite side from the first surface; a plurality of light-emitting elements each disposed inside a corresponding one of the plurality of first recesses; a first light transmission member disposed inside the groove portion of the light guide plate, and having a refractive index lower than a refractive index of the light guide plate; and a reflective resin layer covering the first surface of the light guide plate and the first light transmission member.

20 Claims, 12 Drawing Sheets

(56) References Cited

FOREIGN PATENT DOCUMENTS

| | | | |
|---|---|---|---|
| JP | 2010008837 | A | 1/2010 |
| JP | 2010524168 | A | 7/2010 |
| JP | 2010245023 | A | 10/2010 |
| JP | 2011023353 | A | 2/2011 |
| JP | 2015525444 | A | 9/2015 |
| JP | 2018101521 | A | 6/2018 |
| JP | 2018120923 | A | 8/2018 |
| JP | 2018133304 | A | 8/2018 |
| WO | 2010113361 | A1 | 10/2010 |
| WO | 2013181059 | A1 | 12/2013 |

* cited by examiner

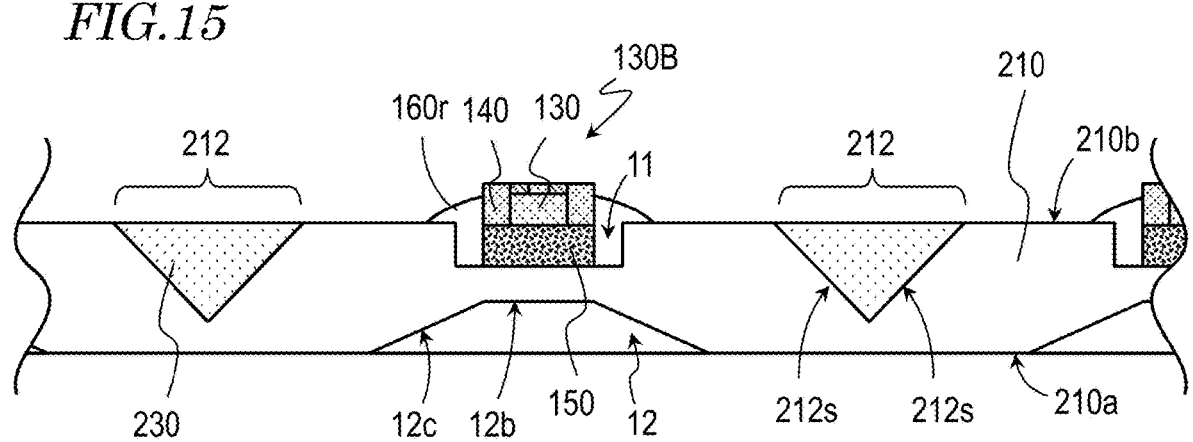
FIG.15
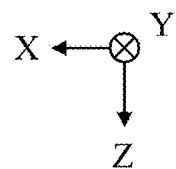
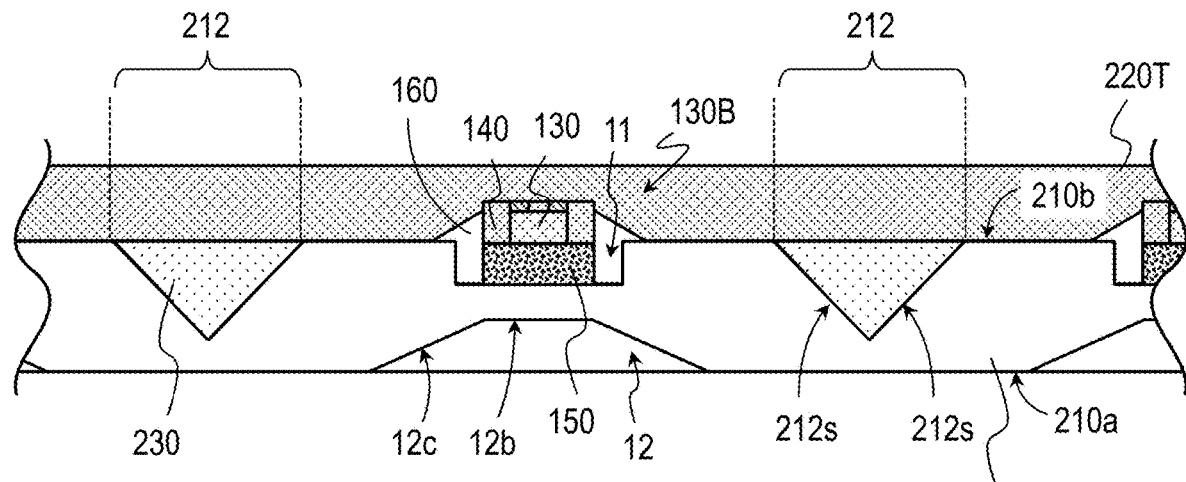
FIG.16
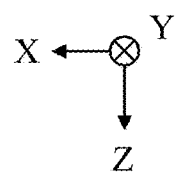

LIGHT-EMITTING MODULE

CROSS REFERENCE TO RELATED APPLICATION

This application claims priority to Japanese Patent Application No. 2018-245673, filed on Dec. 27, 2018, the disclosure of which is hereby incorporated by reference in their entirety.

BACKGROUND

The present disclosure relates to light-emitting modules. The present disclosure also relates to a surface-emission light source including two or more light-emitting modules.

Among the known backlights used in liquid-crystal display devices, etc., are a direct-lit light-emitting device. The direct-lit light-emitting device has a structure in which a plurality of light sources are two-dimensionally arranged, and therefore, can be easily adapted to provide a high contrast ratio compared to an edge-lit light-emitting device, the light of which is introduced into a light guide plate from a lateral surface thereof. Based on this feature of the direct-lit light-emitting device, there has been a proposal to divide the light emission surface into a plurality of light emission regions, and perform control by local dimming to turn on and off these individual light emission regions separately, thereby achieving a higher contrast ratio.

For example, Japanese Patent Publication No. 2018-101521 discloses a direct-lit surface light source device that has a light guide plate having a plurality of recesses on the lower surface thereof, a plurality of light sources, and a mount substrate for supporting the plurality of light sources. In the surface light source device disclosed in Japanese Patent Publication No. 2018-101521, the plurality of light sources are two-dimensionally arranged on the mount substrate and are each located inside a corresponding one of the plurality of recesses of the light guide plate.

In the surface light source device of Japanese Patent Publication No. 2018-101521, a groove is formed on the lower surface of the light guide plate at an outer periphery of each illumination region where a corresponding one of the plurality of light sources is located as the center thereof. The groove has, for example, a reflective layer inside thereof. These grooves located at boundaries between the illumination regions, substantially prevent light from being extracted out through an illumination region where the light source is off. More specifically, a portion of light that is emitted by the light source included in an illumination region and travels toward the inside of other illumination regions adjacent to that illumination region, is reflected at the groove, and therefore, is substantially prevented from being extracted out through these adjacent illumination regions. Thus, in the technique disclosed in Japanese Patent Publication No. 2018-101521, the reduction of the contrast ratio caused by leakage of light between each illumination region can be substantially avoided by providing the grooves on, for example, the lower surface of the light guide plate.

SUMMARY

A light-emitting module according to an embodiment of the present disclosure includes: a light guide plate having a first surface on which a plurality of first recesses arranged in rows and columns and a grid-shaped groove portion surrounding each of the plurality of first recesses are provided, and a second surface located on an opposite side from the first surface; a plurality of light-emitting elements each disposed inside a corresponding one of the plurality of first recesses of the light guide plate; a first light transmission member disposed inside the groove portion of the light guide plate, and having a refractive index lower than a refractive index of the light guide plate; and a reflective resin layer covering the first surface of the light guide plate and the first light transmission member.

An embodiment of the present disclosure provides a light-emitting module to which local dimming can be advantageously applied.

BRIEF DESCRIPTION OF THE DRAWINGS

FIG. 15 is a schematic cross-sectional view for illustrating an exemplary production method for a light-emitting module according to an embodiment of the present disclosure.

FIG. 16 is a schematic cross-sectional view for illustrating an exemplary production method for a light-emitting module according to an embodiment of the present disclosure.

DETAILED DESCRIPTION

Figure 1:
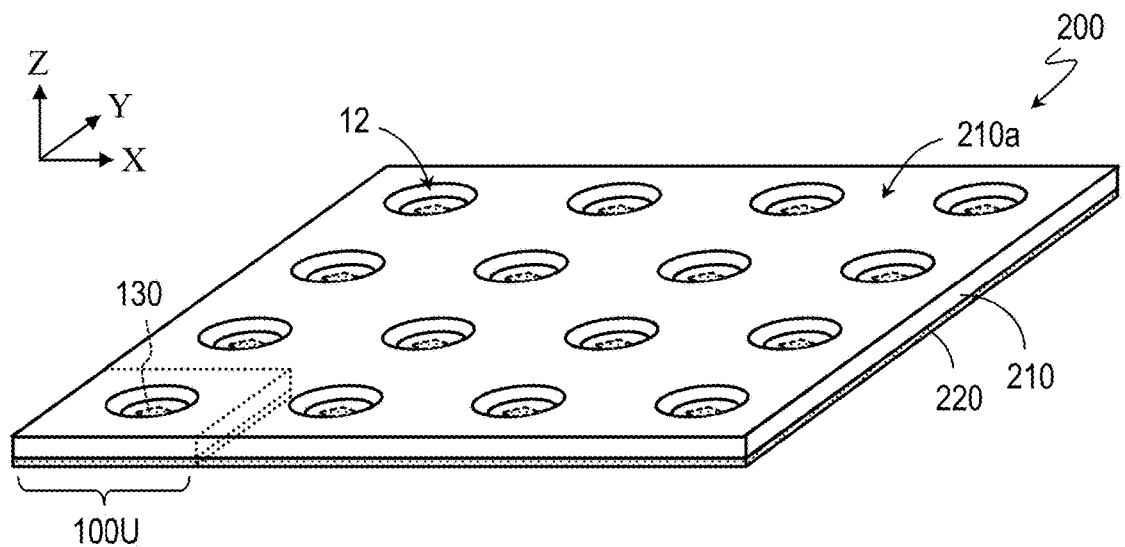
FIG. 1 is a schematic perspective view showing an exemplary configuration of a light-emitting module according to an embodiment of the present disclosure.

Embodiments of the present disclosure will now be described in detail with reference to the accompanying drawings. The following embodiments are illustrative, and the light-emitting module of the present disclosure is not limited thereto. For example, the numerical values, shapes, materials, steps, and the order of the steps, etc., indicated in the following embodiments are merely illustrative, and various modifications can be made thereto unless a technical contradiction occurs.

The dimensions, shapes, etc., of elements shown in the drawings may be exaggerated for clarity. The dimensions, shapes, etc., of the elements of the light-emitting module are not necessarily drawn to scale, e.g., the dimensions of some of the elements of the light-emitting module relative to the other elements may be exaggerated. Some of the elements may not be shown, in order to avoid unnecessarily obfuscating the drawings.

In the description that follows, elements of like functions may be denoted by like reference signs and may not be described redundantly. Terms indicating specific directions and positions (e.g., "upper," "lower," "right," "left," and other terms including such terms) may be hereinafter used. Note however that these terms are only used for clarity of illustration to refer to relative directions and positions in the drawings to which reference is made. When applied to drawings, actual products, actual manufacturing apparatuses, etc., other than those of the present disclosure, the elements may not have the same arrangement as that shown in the drawings to which reference is made, if the elements have the same directions and positions relative to each other that are indicated by the terms such as "upper" and "lower" in the drawings to which reference is made. As used herein, the term "parallel" with respect to two straight lines, sides, planes, etc., is intended to encompass some deviations from absolute parallelism (0°) that are in the range of about ±5° unless otherwise specified. As used herein, the term "perpendicular" or "orthogonal" with respect to two straight lines, sides, planes, etc., is intended to encompass some deviations from absolute perpendicularity or orthogonality (90°) that are in the range of about ±5° unless otherwise specified.

(Embodiments of Light-Emitting Module)

FIG. 1 shows an exemplary configuration of a light-emitting module according to an embodiment of the present disclosure. The light-emitting module 200 shown in FIG. 1 includes a light guide plate 210 having an upper surface 210a, and a layer-shaped reflective resin layer 220 located below the light guide plate 210. Note that FIG. 1 additionally shows arrows indicating an X direction, Y direction, and Z direction that are orthogonal to each other for the sake of convenience. In some of the other figures of the present disclosure, arrows indicating these directions are also shown. In the example of FIG. 1, the upper surface of the light-emitting module 200 (i.e., the upper surface 210a of light guide plate 210) has a rectangular shape that is defined by sides coinciding with the X direction and the Y direction in FIG. 1.

As described in detail below, a light-emitting module according to an embodiment of the present disclosure has a structure including a plurality of recurring structural units each including at least one light-emitting element. Each unit having a light-emitting element is also hereinafter referred to as a "light-emitting cell" for the sake of convenience. As schematically shown in FIG. 1, here, the light-emitting module 200 has a total of 16 light-emitting cells 100U that has a rectangular shape as viewed from above. These light-emitting cells 100U are arranged in a matrix of four rows and four columns extending in the X direction and the Y direction, respectively. Needless to say, the number and arrangement of the light-emitting cells 100U included in the light-emitting module 200 are arbitrary, and are not limited to the example of FIG. 1.

As shown in FIG. 1, each of the plurality of light-emitting cells 100U has a portion of the light guide plate 210, a portion of the reflective resin layer 220, and a light-emitting element 130. As described in detail below with reference to the drawings, the light guide plate 210 has a plurality of first recesses at the lower surface thereof on an opposite side from the upper surface 210a. In each light-emitting cell 100U, the light-emitting element 130 is arranged inside the first recess. Here, because the light-emitting cells 100U are arranged in a matrix of four rows and four columns, the plurality of first recesses are also arranged in a matrix of four rows and four columns on the lower surface of the light guide plate 210.

In the configuration illustrated in FIG. 1, the light guide plate 210 has a plurality of light diffusion structures on the upper surface 210a. Herein, the plurality of light diffusion structures are provided in the respective light-emitting cells 100U in the form of a plurality of second recesses 12. A second recess 12 as a light diffusion structure is provided for each light-emitting cell 100U. In other words, each of the plurality of light-emitting cells 100U includes a light diffusion structure provided at the upper surface 210a of the light guide plate 210.

Each of the plurality of second recesses 12 is typically located on an opposite side from a corresponding one of the first recesses located on the lower surface side of the light guide plate 210. Therefore, here, the plurality of second recesses 12 are arranged at the upper surface 210a of the light guide plate 210 in a matrix of four rows and four columns.

Figure 2:
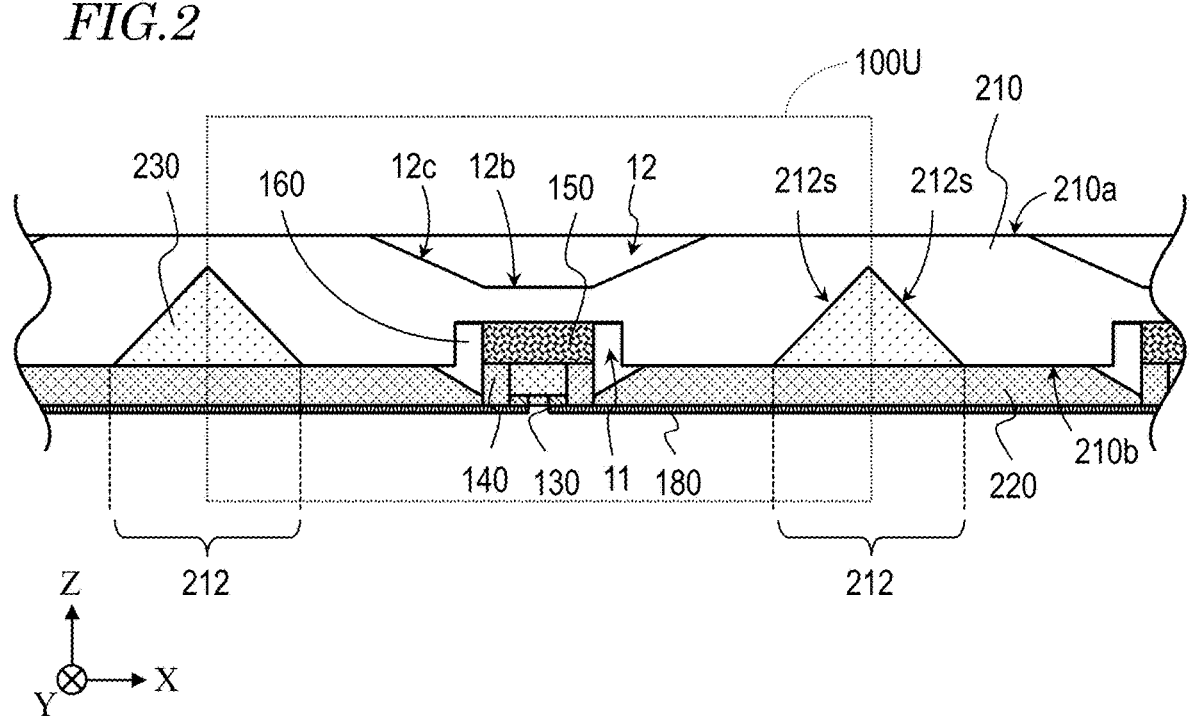
FIG. 2 is a schematic cross-sectional view for illustrating an exemplary configuration of a light-emitting cell shown in FIG. 1.

FIG. 2 schematically shows a portion of a cross-section of the light-emitting module 200 taken perpendicular to the upper surface 210a of the light guide plate 210. As described above, each light-emitting cell 100U includes a portion of the light guide plate 210, a portion of the reflective resin layer 220, and the light-emitting element 130. In this example, an interconnect layer 180 is formed on the reflective resin layer 220. In the configuration illustrated in FIG. 2, each light-emitting cell 100U also has a light reflective member 140 that covers a lateral surface of the light-emitting element 130, a wavelength conversion member 150 arranged inside the first recess 11, and a light transmission member 160.

As shown in FIG. 2, the light guide plate 210 has a lower surface 210b on the opposite side from the upper surface 210a. The plurality of first recesses 11 are provided on the lower surface 210b. As shown in FIG. 2, each light-emitting element 130 is disposed inside the corresponding first recess 11.

The light guide plate 210 further has a plurality of grooves 212 on the lower surface 210b. As shown in FIG. 2, the inside of each groove 212 is filled with a first light transmission member 230. Hereinafter, the "light transmission member 160" is referred to as a "second light transmission member 160." Note that as used herein, the terms "light transmissive" and "light transmission" are intended to encompass the ability to diffuse incident light, and is not limited to "transparent."

Each groove 212 is located at a boundary between a corresponding pair of two adjacent light-emitting cells 100U. In this example, each groove 212 has a V-shaped cross-sectional shape defined by two sloped surfaces 212s which are sloped with respect to the lower surface 210b. Note that as described below, the cross-sectional shape of the groove 212 is not limited to a V shape, and may have other shapes.

Figure 3:
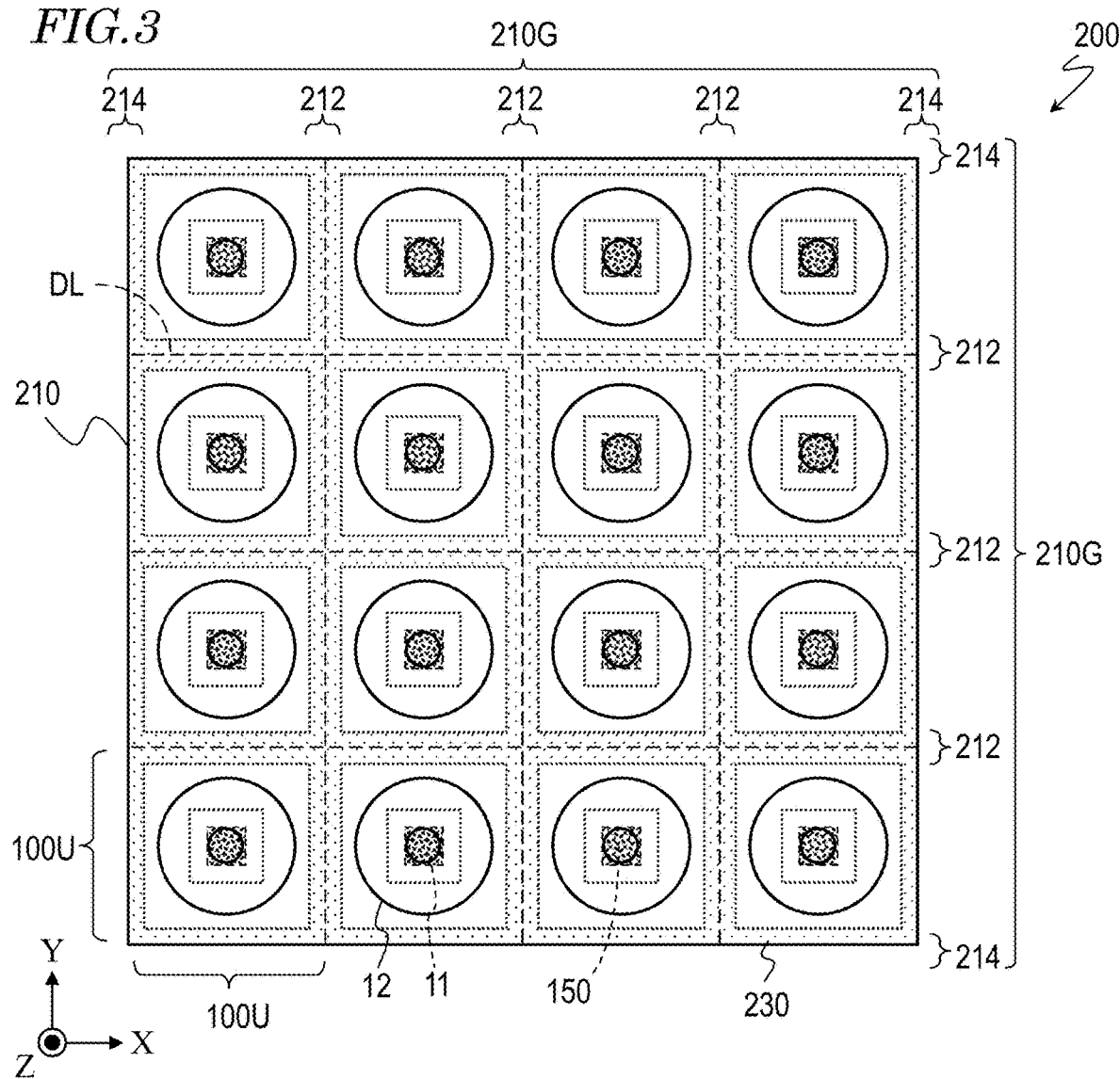
FIG. 3 is a schematic plan view showing an exemplary appearance of a light-emitting module 200 as viewed in a direction normal to an upper surface 210a of a light guide plate 210.

FIG. 3 schematically shows an appearance of the light-emitting module 200 as viewed in a direction normal to the upper surface 210a of the light guide plate 210. In this example, each light-emitting cell 100U has a rectangular outer shape, and therefore, the upper surface 210a of the light guide plate 210, which forms the light emission surface of the light-emitting module 200, also has a rectangular outer shape as a whole. The lengths of the sides of the upper surface 210a of the light guide plate 210 may be in the range of, for example, 1 cm to 200 cm. In a typical embodiment of the present disclosure, the lengths of the sides of the rectangular shape of each light-emitting cell 100U is 20 mm to 25 mm.

As schematically shown in FIG. 3, each groove 212 located between a corresponding pair of two adjacent light-emitting cells 100U extends in the X or Y direction in FIG. 3. Dashed lines DL shown in FIG. 3 each indicate a deepest portion of the corresponding groove 212; in other words, the position of a vertex of the triangular prism defined by the two sloped surfaces 212s.

The light guide plate 210 further has grooves 214 at outer edges thereof. The grooves 214 have about half the width of the grooves 212. As with the inside of the grooves 212, the inside of the grooves 214 is filled with the first light transmission member 230. These grooves 212 and 214, which are formed on the lower surface 210b of the light guide plate 210, together form a grid-shaped groove portion 210G that surrounds each of the plurality of first recesses 11 of the light guide plate 210.

Figure 4:
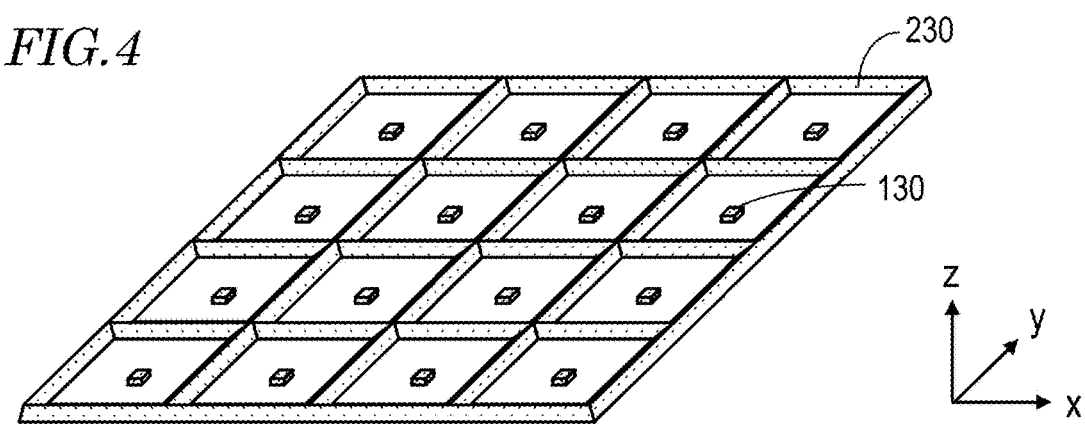
FIG. 4 is a perspective view schematically showing a representation of light-emitting elements 130 and a first light transmission member 230 as separated from a light-emitting module 200, indicating an arrangement thereof.

FIG. 4 shows a representation of the light-emitting elements 130 and the first light transmission member 230 as separated from the light-emitting module 200, indicating the arrangement thereof. Because the groove portion 210G, which is formed on the lower surface 210b of the light guide plate 210, has a grid shape, the first light transmission member 230, which is located inside the grooves 212 and 214, has a similar grid shape, which also surrounds each of the plurality of first recesses 11. Therefore, as shown in FIG. 4, the light-emitting element 130 of each light-emitting cell 100U is surrounded by the first light transmission member 230.

As schematically shown in FIG. 4, the first light transmission member 230 includes a plurality of triangular prism-shaped portions each extending in the X or Y direction. Herein, the light-emitting element 130 of each light-emitting cell 100U is surrounded by the sloped surfaces extending in the X and Y directions in FIG. 4. As described below, the first light transmission member 230 has a refractive index lower than a refractive index of the light guide plate 210. Therefore, an interface between the first light transmission member 230 and the light guide plate 210 serves as a reflective surface. This allows light emitted from the light-emitting element 130 of one light-emitting cell 100U and traveling toward other light-emitting cells 100U to be reflected at the sloped surfaces surrounding that light-emitting element 130 and then travel toward the upper surface 210a of the light guide plate 210. Note that the first light transmission member 230 has light transmissivity, and therefore, at least a portion of incident light to the interface between the first light transmission member 230 and the light guide plate 210, passes through the first light transmission member 230 to reach adjacent other light-emitting cells 100U.

Figure 5:
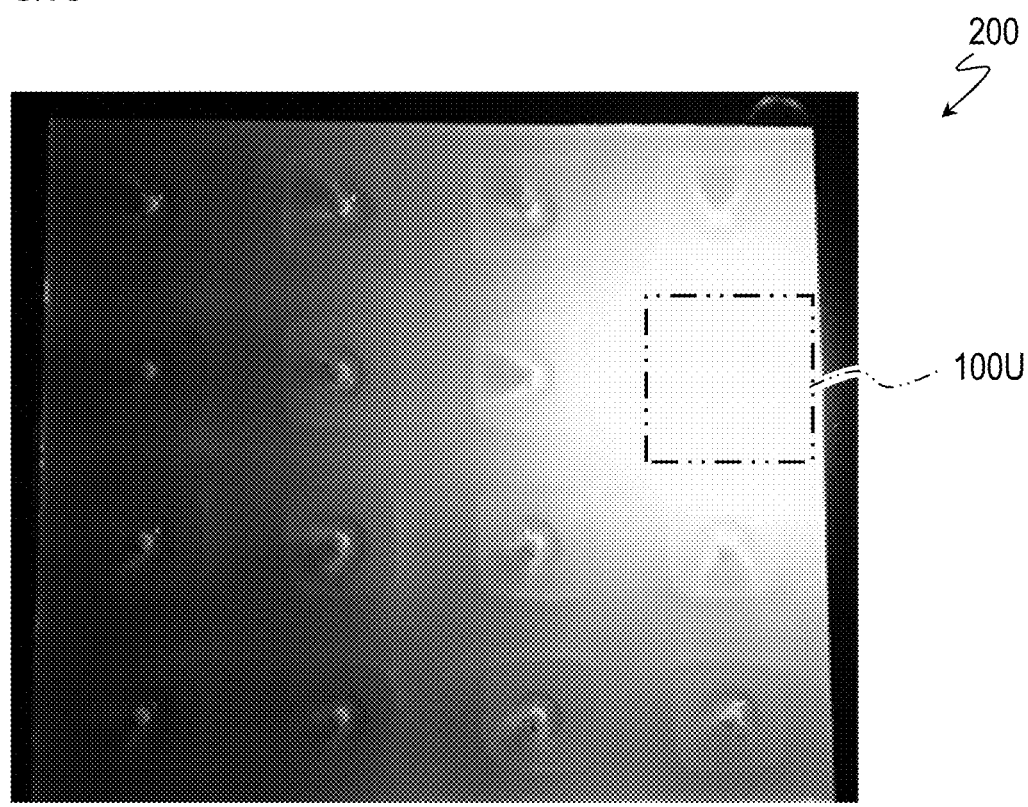
FIG. 5 is a diagram showing a state of a light emission surface that occurred when a light-emitting element of one of a plurality of light-emitting cells was lit in a light-emitting module according to an embodiment of the present disclosure.

FIG. 5 shows a state of a light emission surface that occurred when the light-emitting element of one of the plurality of light-emitting cells was lit. In this example, the light-emitting element 130 of one of 16 light-emitting cells 100U arranged in a matrix of four rows and four columns, that is located at the intersection of the second row and the fourth column, was selectively lit. As can be seen, light emitted by the light-emitting element 130 in the on state entered other light-emitting cells 100U located therearound, because the first light transmission member 230, which is provided inside the groove 212 located between two adjacent light-emitting cells 100U, can transmit light.

In contrast to this, in the case where the sloped surfaces surrounding each light-emitting element are substantially a perfect reflective surface, light emitted by the light-emitting element does not directly enter an adjacent light-emitting cell. Note that there is a component that enters an adjacent light-emitting cell due to total reflection at the upper surface of the light guide plate. Light entering a light-emitting cell whose light-emitting element is in the off state is repeatedly reflected inside the cell before being emitted out of the light-emitting cell. The light emitted out of the light-emitting cell includes light reflected by the sloped surfaces surrounding that light-emitting element in the off state. Therefore, in such a configuration, a block-shaped light emission pattern may appear on the light emission surface. The block-shaped light emission pattern on the light emission surface may cause an unnatural variance in luminance in image display.

Also in the case where the sloped surfaces surrounding each light-emitting element are substantially a perfect reflective surface, when a portion of the plurality of light-emitting elements are turned on, a bright region of the light emission surface may have a too nearly rectangular shape. For example, in some local dimming applications, there may be a situation that a light emission region on a printed circuit board is in the on state while a plurality of light emission regions located therearound are in the off state. In such an operation, a too nearly rectangular light emission pattern on the light emission surface may be disadvantageous to image display when the light-emitting module is used in combination with a liquid-crystal panel. For example, a complicated drive circuit and/or image processing circuit may be required for image display having a desired high contrast ratio. In particular, in the case where there are a relatively small number of regions that can be controlled so that the regions are individually turned on and off, an unintended, unnatural variance in luminance may not be fully corrected by image processing, so that an image cannot be displayed with natural brightness and contrast. This tendency typically becomes more significant as the distance between the light-emitting element and the liquid-crystal panel decreases.

Meanwhile, in the example shown in FIG. 5, the grooves 212 located at the boundaries between the plurality of light-emitting cells 100U each including a light-emitting element 130 allow a portion of light emitted by the light-emitting element 130 to be transmitted into adjacent light-emitting cells 100U while another portion of the light is reflected toward the upper surface 210*a* of the light guide plate 210. Therefore, even when a portion of the plurality of light-emitting elements 130 are turned on, a boundary between light emission regions may be substantially prevented from clearly appearing on the upper surface 210*a* of the light guide plate 210 due to contrast between bright and dark regions. Therefore, the step-shaped change in luminance of the light emission surface may be reduced, so that the change in luminance of the light emission surface may be closer to a continuous change. According to the embodiments of the present disclosure, the shape of a bright region of the light emission surface may be closer to, for example, a circular shape. Thus, according to the embodiments of the present disclosure, an image that is natural and has a high contrast ratio may be displayed while the complication of the drive circuit is substantially avoided, and local dimming may be advantageously applied.

Each element of the light-emitting cell 100U will now be described in greater detail with reference to the drawings.

[Light Guide Plate 210]

Reference is made to FIG. 2. The light guide plate 210 is a generally plate-shaped member that is formed of a thermoplastic resin, such as a polycarbonate, an acrylic, a cyclic polyolefin, polyethylene terephthalate, or a polyester, a thermosetting resin, such as an epoxy or a silicone, or glass, and has light transmissivity. Of these materials, particularly, polycarbonates cost low and may provide a high transparency. Note that the light guide plate 210 may, for example, include a material dispersed therein that has a refractive index different from that of the base material, and may thereby have a light diffusion function.

As described above, the light guide plate 210 has a plurality of light diffusion structures on the upper surface 210*a*. With the light diffusion structures, light emitted from the light-emitting elements 130 and then entering the light guide plate 210 is reflected at the interface with, for example, an air layer and is thereby diffused in the light guide plate 210, particularly along the upper and lower surfaces thereof. Thus by providing the light diffusion structures on the upper surface 210*a* of the light guide plate 210, light emitted from the light-emitting elements 130 and then traveling directly upward can be effectively diffused by the light diffusion structures into the light guide plate 210, resulting in an improvement in the luminance of regions of the upper surface 210*a* that are not directly above the light-emitting elements 130. In other words, the unevenness in luminance of the upper surface of the light-emitting module 200 can be effectively reduced, and therefore, more uniform light can be obtained.

The light diffusion structures provided on the upper surface 210*a* of the light guide plate 210 contribute to a reduction in thickness of the light guide plate 210. The thickness of the light guide plate 210 is typically about 0.1 mm or longer and 5 mm or shorter, and particularly, according to an embodiment of the present disclosure, may be in the range of about 0.5 mm or longer and 3 mm or shorter.

In the configuration illustrated in FIG. 2, the light diffusion structure is provided on the upper surface 210*a* of the light guide plate 210 in the form of a second recess 12 having an inverted truncated conical shape having a bottom surface 12*b* and a lateral surface 12*c*. The second recess 12 reflects light traveling through the light guide plate 210 toward the upper surface 210*a* at an interface between the lateral surface 12*c*, which is a sloped surface, and an air layer. The cross-sectional shapes of the bottom surface 12*b* and the lateral surface 12*c* are not limited to a straight line as shown in FIG. 2, and may be a curved shape or a shape with a bend or a step. The inside of the second recess 12 may be filled with a material having a refractive index different from that of the material of the light guide plate 210 itself. Alternatively, a light-reflective member, such as a reflective film of a metal or the like, or a white resin layer, may be provided on the bottom surface 12*b* and the lateral surface 12*c*.

The specific configuration of the light diffusion structure is not limited to the structure of the second recess 12 shown in FIG. 2. The specific configuration of the light diffusion structure can be appropriately determined, depending on the shape, characteristics, etc., of the light-emitting element 130 provided on the lower surface 210*b* side of the light guide plate 210. In addition, even when the light diffusion structure is provided in the form of a recess, the shape of the recess is not limited to an inverted truncated conical shape, and may be appropriately changed, depending on desired optical characteristics. For example, the second recess 12 may be in the shape of a cone or a polygonal pyramid such as a quadrangular pyramid or a hexagonal pyramid, or a truncated polygonal pyramid, etc. The second recess 12 has a depth in the range of, for example, 0.05 mm or longer and 3 mm or shorter. Instead of the recess, a protruding portion that protrudes from the upper surface 210*a* may also be used as the light diffusion structure.

The light guide plate 210 has the plurality of first recesses 11 at the lower surface 210*b*. As can be seen from FIG. 2, each of the plurality of first recesses 11 on the lower surface 210*b* (first surface) of the light guide plate 210 is typically located directly below a corresponding one of the plurality of light diffusion structures on the upper surface 210*a* (second surface) of the light guide plate 210.

In the example described with reference to FIG. 3, each of the plurality of first recesses 11 has a square outer shape. In other words, herein, each of the plurality of first recesses 11 is a hole having a quadrangular prism shape. Lengths along diagonal directions of the bottom surface (lower base) of the quadrangle prism shape may, for example, be 0.05 mm or longer and 10 mm or shorter, preferably 0.1 mm or longer and 1 mm or shorter. The length in the diagonal direction of the quadrangular shape of the first recess 11 may be substantially equal to the diameter of the bottom surface 12*b* of the second recess 12 provided on the upper surface 210*a* of the light guide plate 210. The shape and size of the first recess 11 may be appropriately determined, depending on desired optical characteristics. The first recess 11 and the second recess 12 are typically substantially concentric.

In the case where the light guide plate 210 and the first recess 11 each has a rectangular shape as viewed from above, one side of the rectangular shape of the first recess 11 may be parallel to one side of the rectangular shape of the light guide plate 210 (as shown in FIG. 3), or may be parallel to a diagonal direction of the rectangular shape of the light guide plate 210. For example, the rectangular shape of the recess 11 may be tilted by 45° relative to the rectangular shape of the light guide plate 210. In this case, while the distance between a side of the rectangular shape of the first recess 11 and a sloped surface (e.g., the sloped surface 212s) around the light-emitting element 130 can be increased, the distance between a corner of the rectangular shape of the first recess 11 and the sloped surface may be decreased. With such a configuration, while the luminances at the four corners of the rectangular light-emitting cell 100U may be increased, and the luminances at near the centers of the sides of the rectangular shape may be relatively decreased.

In the case where light diffusion structures are provided on the upper surface 210a in the form of the second recesses 12, a depth of the first recesses 11, which are located on the lower surface 210b, may be appropriately set as long as the first recesses 11 do not reach the bottom surfaces 12b of the second recesses 12. For example, the first recesses 11 may have a depth in the range of, for example, 0.05 mm or longer and 4 mm or shorter, preferably 0.1 mm or longer and 1 mm or shorter.

The shape of the first recess 11 as viewed from above may be a circular shape, in addition to a rectangular shape as shown in FIG. 3. In the case where the first recess 11 has, for example, a cylindrical shape, the diameter of the bottom surface (lower base) of the cylindrical shape may be substantially equal to the diameter of the bottom surface 12b of the truncated conical shape of the second recess 12 provided on the upper surface 210a of the light guide plate 210.

As described above, the lower surface 210b of the light guide plate 210 further has the groove portion 210G, which has a grid shape as viewed from above. The groove portion 210G, which is located at a boundary between two adjacent light-emitting cells 100U, includes, for example, the grooves 212 including the two sloped surfaces 212s, and the grooves 214 located at an outer periphery of the light guide plate 210 (see FIG. 3). As with the groove 212, the groove 214 has a sloped surface that is sloped relative to the lower surface 210b of the light guide plate 210 so as to reflect incident light toward the upper surface 210a of the light guide plate 210.

Figure 6:
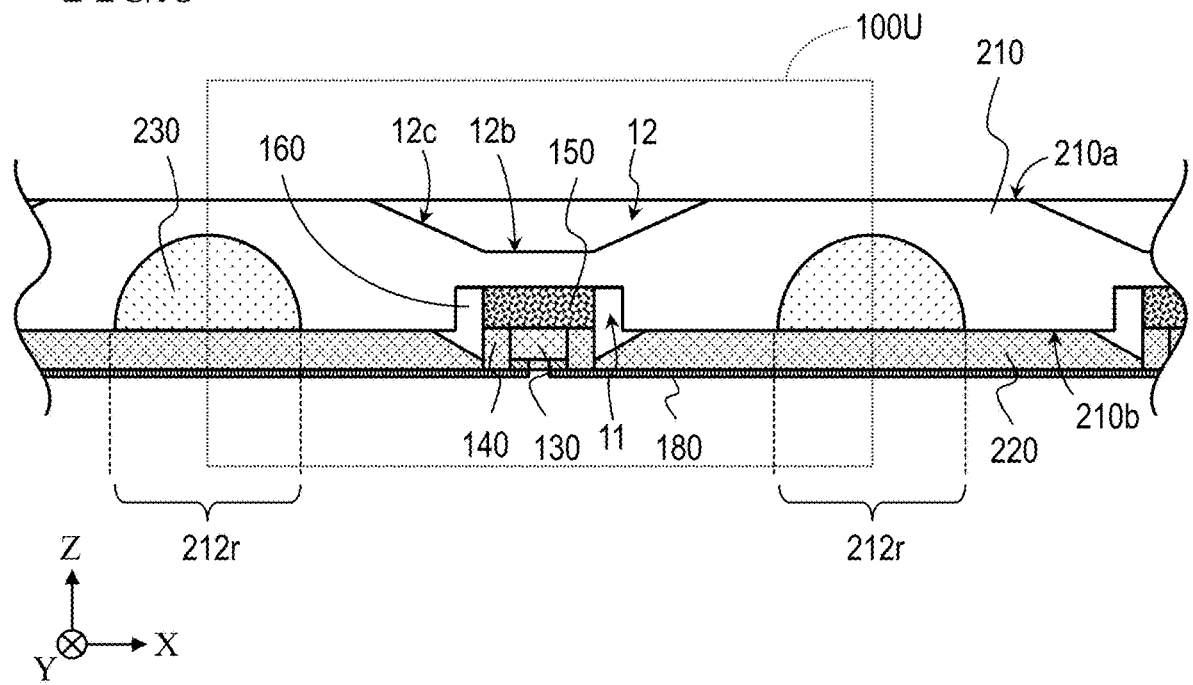
FIG. 6 is a schematic cross-sectional view showing another example relating to a plurality of grooves included in a grid-shaped groove portion.

The grid-shaped groove portion that surrounds each light-emitting element 130 may be in the shape of a groove having a V-shaped cross-sectional shape (e.g., V-groove), and may be provided on the lower surface 210b of the light guide plate 210. Alternatively, as shown in FIG. 6, the grid-shaped groove portion may be provided in the form of a set of, for example, round grooves 212r (e.g., U-groove) that extend in the row and column directions of the array of the plurality of light-emitting cells 100U. As used herein, the cross-sectional shape of the "round groove" is not limited to a semicircle as shown in FIG. 6, and may be semielliptical or the like. As used herein, the "round groove" is interpreted in a broad sense to encompass grooves having a U-shaped cross-sectional shape partially including a curved surface, etc.

[First Light Transmission Member 230]

The first light transmission member 230 fills the inside of the groove portion 210G, and therefore, has a shape corresponding to the shape of the groove portion 210G. The first light transmission member 230 has a refractive index lower than a refractive index of the light guide plate 210. The first light transmission member 230, which may be formed of, for example, a light transmissive and thermosetting resin material, such as an epoxy resin, silicone resin, or acrylic resin, may typically have a refractive index of about 1.35 to 1.6, while the light guide plate 210 may typically have a refractive index of about 1.5 to 1.7.

Because the first light transmission member 230 has a refractive index lower than that of the light guide plate 210, the interface between the first light transmission member 230 and the light guide plate 210 can transmit a portion of incident light while reflecting the remaining components toward the upper surface 210a of the light guide plate 210. The first light transmission member 230 may, for example, contain a material dispersed therein that has a refractive index different from that of the base material, and may thereby have a light diffusion function. Note that as used herein, the "refractive index" is as measured using the sodium D line (589 nm).

[Light-Emitting Element 130]

Figure 7:
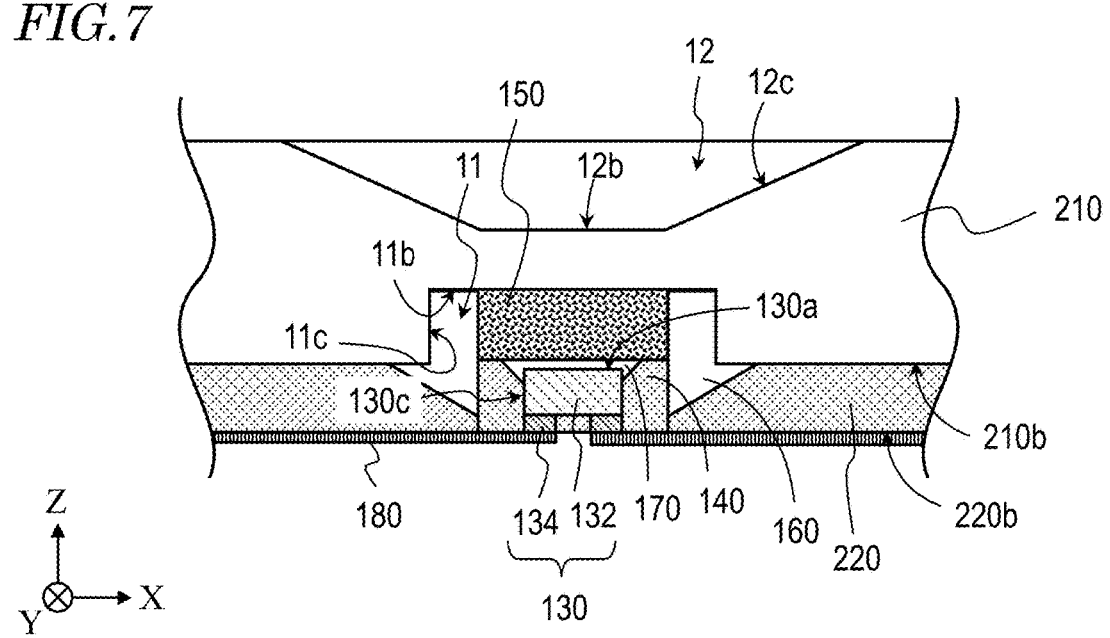
FIG. 7 is a schematic enlarged cross-sectional view of a light-emitting element 130 and the vicinity thereof shown in FIG. 2.

FIG. 7 shows an enlarged view of the light-emitting element 130 and the vicinity thereof shown in FIG. 2. Each light-emitting element 130 is arranged inside a corresponding one of the plurality of first recesses 11 provided on the lower surface 210b of the light guide plate 210. Here, each light-emitting element 130 is located directly below a corresponding one of the plurality of light diffusion structures provided on the upper surface 210a of the light guide plate 210.

A typical example of the light-emitting element 130 is an LED. In the configuration illustrated in FIG. 7, the light-emitting element 130 includes an element body 132, and electrodes 134 located on the opposite side from an upper surface 130a of the light-emitting element 130. For example, the element body 132 includes a support substrate of sapphire or gallium nitride, etc., and a multilayer semiconductor structure on the support substrate. The multilayer semiconductor structure includes an active layer, and an n-type semiconductor layer and a p-type semiconductor layer with the active layer sandwiched therebetween. The multilayer semiconductor structure may include a nitride semiconductor ($In_xAl_yGa_{1-x-y}N$, $0 \leq x$, $0 \leq y$, $x+y \leq 1$) capable of emitting light in the ultraviolet to visible range. In this example, the upper surface 130a of the light-emitting element 130 is the upper surface of the element body 132. The electrodes 134, which includes a pair of a positive electrode and a negative electrode, has the function of supplying a predetermined current to the multilayer semiconductor structure.

Herein, as the light-emitting element 130, an LED that emits blue light is illustrated. Note that the plurality of light-emitting elements 130 provided in the light-emitting module 200 are not limited to an element that emits blue light. The plurality of light-emitting elements 130 may, for example, be an element that emits white light or include elements that emit light of different colors. The plurality of light-emitting elements 130 may include an element that emits red light, an element that emits blue light, and an element that emits green light.

Each of the plurality of light-emitting elements 130 is joined to a corresponding one of the wavelength conversion members 150 provided inside the respective first recesses 11. In this example, the light-emitting element 130 is secured at a predetermined position inside the first recess 11 by the upper surface 130a being joined to the wavelength conversion member 150 by a bonding member 170 described below. As used herein, the inside of the first recess 11 means an inside of the first recess 11 as viewed from above. As can be seen from FIG. 7, in an embodiment of the present disclosure, it is not essential that the light-emitting element 130 be entirely located inside the first recess 11 in a cross-sectional view. For example, the upper surface 130a of the light-emitting element 130 may be located at a position lower than that of the lower surface 210b of the light guide plate 210.

The light-emitting element 130 typically has a rectangular shape as viewed from above. The lengths of the sides of the rectangular shape of the light-emitting element 130 are, for example, 1000 μm or less. The lengthwise and widthwise dimensions of the rectangular shape of the light-emitting element 130 may be 500 μm or less. Light-emitting elements whose lengthwise and widthwise dimensions are 500 μm or less are available at low cost. Alternatively, the lengthwise and widthwise dimensions of the rectangular shape of the light-emitting element 130 may be 200 μm or less. In the case where the light-emitting element 130 is applied to a backlight unit of a liquid-crystal display device, if the lengths of the sides of the rectangular shape of the light-emitting element 130 are small, the light-emitting element 130 is advantageous to representation of high-definition images, local dimming, etc. In particular, in the case of a light-emitting element whose lengthwise and widthwise dimensions are both 250 μm or less, the area of the upper surface is small, and therefore, the amount of light emitted from the lateral surface of the light-emitting element relatively increases. Therefore, it is easy to obtain batwing light distribution characteristics. As used herein, the term "batwing light distribution characteristics" refers, in a broad sense, to light distribution characteristics that are defined as an emission intensity distribution in which the emission intensity is higher at light distribution angles whose absolute values are greater than zero, compared to the emission intensity at a light distribution angle of 0°, where the optical axis that is perpendicular to the upper surface of the light-emitting element has a light distribution angle of 0°.

In the light-emitting module 200, the plurality of light-emitting elements 130 are arranged two-dimensionally along the X and Y directions. The arrangement pitch of the light-emitting elements 130 may be, for example, about 0.05 mm or longer and 20 mm or shorter, and may be in the range of about 1 mm or longer and 10 mm or shorter. As used herein, the arrangement pitch of the light-emitting elements 130 refers to the distance between the optical axes of the successive light-emitting elements 130. The light-emitting elements 130 may be spaced either equally or unequally. The arrangement pitches in two different directions of the light-emitting elements 130 may be the same or different. The number and arrangement of the light-emitting elements 130 are not limited to those of the example described above with reference to FIG. 1, and may be any other suitable numbers and arrangements.

[Wavelength Conversion Member 150]

The wavelength conversion member 150, which is a generally plate-shaped, may be arranged at a bottom portion of the first recess 11. As used herein, the term "bottom portion" with respect to the first recess 11 means a portion that corresponds to the bottom of the first recess 11 as is considered as a hole with the lower surface 210b of the light guide plate 210 facing up. Thus, the terms "bottom portion" and "bottom surface" may be used herein irrespective of the orientation of the light-emitting module shown in the drawings. When the light-emitting cell 100U is in the orientation shown in FIG. 7, the bottom portion of the first recess 11 may also be said to be a ceiling portion of the dome-shaped structure formed on the lower surface 210b of the light guide plate 210. Herein, the first recess 11 may be formed on the light guide plate 210 in the shape of a quadrangular prism-shaped hole that is defined by a bottom surface 11b and four lateral surfaces 11c. The wavelength conversion member 150 may be provided between the bottom surface 11b of the first recess 11 and the upper surface 130a of the light-emitting element 130.

The wavelength conversion member 150 typically includes particles of a phosphor dispersed in a resin. The wavelength conversion member 150 absorbs at least a portion of light emitted from the light-emitting element 130 to output light having a wavelength different from that of the light from the light-emitting element 130. For example, the wavelength conversion member 150 converts a portion of blue light from the light-emitting element 130 to output yellow light. With such a configuration, blue light transmitted through the wavelength conversion member 130 and yellow light emitted from the wavelength conversion member 150 are mixed together to obtain white light.

The resin in which the particles of a phosphor or the like are dispersed may be a silicone resin, modified silicone resin, epoxy resin, modified epoxy resin, urea resin, phenolic resin, acrylic resin, urethane resin, or fluorine resin, or a resin that includes two or more of these resins. In order to efficiently introduce light into the light guide plate 210, the base material of the wavelength conversion member 150 preferably has a refractive index lower than that of the base material of the light guide plate 210. The light diffusion function of the wavelength conversion member 150 may be achieved by dispersing a material having a refractive index different from that of the base material, in the material of the wavelength conversion member 150. For example, particles of titanium dioxide, silicon oxide, etc., may be dispersed in the base material of the wavelength conversion member 150.

As the phosphor, a known material may be used. Examples of the phosphor include YAG phosphors, β-SiAlON phosphors, fluoride phosphors such as a KSF phosphor, and nitride phosphors such as CASN. YAG phosphors are an example of a wavelength conversion substance that converts blue light into yellow light. KSF phosphors and CASN are an example of a wavelength conversion substance that converts blue light into red light. β-SiAlON phosphors are an example of a wavelength conversion substance that converts blue light into green light. The phosphor may be a quantum dot phosphor.

It is not essential that the wavelength conversion members 150 in the light-emitting module 200 should share a common phosphor. The different first recesses 11 in the plurality of light-emitting cells 100U may contain different phosphors dispersed in the base material of the wavelength conversion members 150. For example, a portion of the first recesses 11 may have a wavelength conversion member that converts incident blue light into yellow light, and another portion of the first recesses 11 may have a wavelength conversion member that converts incident blue light into green light. Moreover, the remainder of the first recesses may have a wavelength conversion member that converts incident blue light into red light.

[Bonding Member 170]

The bonding member 170 is a light transmissive member that covers at least a portion of a lateral surface 130c of the light-emitting element 130. As schematically shown in FIG. 7, the bonding member 170 typically has a layer-shaped portion that is located between the upper surface 130a of the light-emitting element 130 and the wavelength conversion member 150. In this embodiment, a single bonding member 170 is provided on the wavelength conversion member 150, corresponding to the wavelength conversion member 150 provided in each of the plurality of first recesses 11.

A material for the bonding member 170 may be a resin composition that includes a transparent resin material as a base material. The bonding member 170 has a transmittance of, for example, 60% or more for light having the peak emission wavelength of the light-emitting element 130. The transmittance of the bonding member 170 at the peak emission wavelength of the light emitting element 130 is preferably 70% or more, more preferably 80% or more, in terms of the effective use of light.

A typical example of the base material of the bonding member 170 is a thermosetting resin, such as an epoxy resin or a silicone resin. The base material of the bonding member 170 may be a silicone resin, modified silicone resin, epoxy resin, phenolic resin, polycarbonate resin, acrylic resin, polymethylpentene resin, or polynorbornene resin, or a material including two or more of these materials. The light diffusion function of the bonding member 170 may, for example, include a material dispersed therein that has a refractive index different from that of the base material, and may thereby have a light diffusion function.

As described above, the bonding member 170 covers at least a portion of the lateral surface 130c of the light-emitting element 130. The bonding member 170 has an outer surface which is an interface with a light reflective member 140 to be described below. Light emitted from the lateral surface 130c of the light-emitting element 130 and entering the bonding member 170 is reflected, at the outer surface of the bonding member 170, upward relative to the light-emitting element 130. By thus securing the light-emitting element 130 to the wavelength conversion member 150 using the bonding member 170 and covering these parts with the light reflective member 140, light extraction efficiency can be improved.

The cross-sectional shape of the outer surface of the bonding member 170 is not limited to a straight line as shown in FIG. 7. The cross-sectional shape of the outer surface of the bonding member 170 may be a zigzag line, a curved line that protrudes toward the light-emitting element 130, a curved line that protrudes away from the light-emitting element 130, etc.

[Light Reflective Member 140]

The light reflective member 140 covers the bonding member 170 and the lateral surface 130c of the light-emitting element 130 inside each of the plurality of first recesses 11. Note that the term "cover" as used herein is not limited to embodiments where a covered member and a covering member are in direct contact with each other, and is intended to encompass embodiments where another member is interposed therebetween. In the example shown in FIG. 7, the bonding member 170 is interposed between a portion of the lateral surface 130c of the light-emitting element 130 and the light reflective member 140. Note however that the light reflective member 140 also covers the entire outer surface of the bonding member 170, and therefore, it can be said that the four lateral surfaces 130c of the light-emitting element 130 are entirely covered by the light reflective member 140.

The light reflective layer 140 is formed of, for example, a light reflective material, such as a resin in which a light reflective filler is dispersed. As used herein, the term "light reflective" or "reflective" means that the reflectivity is 60% or more at the peak emission wavelength of the light-emitting element 130. The reflectivity of the light reflective layer 140 at the peak emission wavelength of the light-emitting element 130 is more preferably 70% or more, even more preferably 80% or more.

A base material for forming the light reflective layer 140 may be a silicone resin, phenolic resin, epoxy resin, BT resin, polyphthalamide (PPA), etc. The light reflective filler may be metal particles, or particles of an inorganic or organic material having a refractive index higher than that of the base material in which the light reflective filler is dispersed. Examples of the light reflective filler include particles of titanium dioxide, silicon oxide, zirconium dioxide, potassium titanate, aluminum oxide, aluminum nitride, boron nitride, mullite, niobium oxide, and barium sulfate, or particles of various rare earth oxides, such as yttrium oxide and gadolinium oxide.

By covering the bonding member 170 and the light-emitting element 130 on the wavelength conversion member 150 with the light reflective member 140, particularly, light emitted from the lateral surfaces 130c of the light-emitting element 130 can be reflected at an interface between the outer surface of the bonding member 170 and the light reflective member 140, and can thereby be introduced into the wavelength conversion member 150. Therefore, light extraction efficiency may be improved. In this example, as schematically shown in FIG. 7, the light reflective member 140 also covers a portion of the surface of the light-emitting element 130 on the opposite side from the upper surface 130a, except for a region where the electrodes 134 is provided. By thus covering the surface of the light-emitting element 130 on the opposite side from the upper surface 130a, except for the lower surfaces of the electrodes 134, with the light reflective member 140, leakage of light to the opposite side from the upper surface 130a of the light-emitting element 130 can be substantially prevented, resulting in an improvement in light extraction efficiency.

[Second Light Transmission Member 160]

The wavelength conversion member 150, the light-emitting element 130, which is secured to the wavelength conversion member 150 by the bonding member 170, and the light reflective member 140, may be disposed on the bottom surface 11b of a corresponding one of the plurality of first recesses 11 by the second light transmission member 160. As shown in FIG. 7, at least a portion of the second light transmission member 160 is located inside the corresponding first recess 11. The second light transmission member 160 may have a portion located between the bottom surface 11b of the first recess 11 and the wavelength conversion member 150. As shown in FIG. 7, the second light transmission member 160 may also have a raised portion from the lower surface 210b of the light guide plate 210.

As with the bonding member 170, the second light transmission member 160 may be formed of a resin composition containing a transparent resin material as a base material. The material of the second light transmission member 160 may be either the same as or different from the material of the bonding member 170. The second light transmission member 160 typically has a refractive index lower than a refractive index of the light guide plate 210.

[Reflective Resin Layer 220]

The reflective resin layer 220 may be located on the lower surface 210b of the light guide plate 210. Herein, the reflective resin layer 220 may cover the lower surface 210b of the light guide plate 210 as well as the first light transmission member 230 (see FIG. 2).

As with the above light reflective member 140, the reflective resin layer 220 may be formed of, for example, a light reflective material, such as a resin composition in which a light reflective filler is dispersed, and may have a reflectance of 60% or more with respect to light having the peak emission wavelength of the light-emitting element 130. A material for the reflective resin layer 220 may be either the same as or different from that for the light reflective member 140.

The reflective resin layer 220 serves as a light reflective layer that reflects incident light toward the light guide plate 210. By covering the lower surface 210b of the light guide plate 210 and the first light transmission member 230 with the reflective resin layer 220, light traveling toward the lower surface 210*b* of the light guide plate 210 may be reflected by the reflective resin layer 220, resulting in an improvement in luminance at the upper surface 210*a* of the light guide plate 210. In addition, by additionally covering the second light transmission member 160 with the reflective resin layer 220 as in this example, light leakage from the second light transmission member 160 may be substantially prevented, and therefore, a reduction in light extraction efficiency may be substantially avoided. By forming the reflective resin layer 220 on the lower surface 210*b* of the light guide plate 210, it may be expected that the light-emitting element 130, etc., may be substantially prevented from coming off from the light guide plate 210, the light guide plate 210 may be reinforced, etc.

A thickness of the structure including the light reflective resin layer 220, i.e., a distance between the lower surfaces of the electrodes 134 of the light-emitting element 130 and the upper surface 210*a* of the light guide plate 210, may be 0.7 mm or longer and 1.1 mm or shorter. According to an embodiment of the present disclosure, the distance between the lower surfaces of the electrodes 134 of the light-emitting element 130 and the upper surface 210*a* of the light guide plate 210, may be reduced to, for example, 5 mm or less, 3 mm or less, or 1 mm or less.

[Interconnect Layer 180]

The interconnect layer 180, which is located on a lower surface 220*b* of the light reflective member 220, typically includes a plurality of interconnects in the form of a single-layer film or multilayer film formed of a metal, such as Cu. As shown in FIG. 7, the lower surfaces of the electrodes 134 of the light-emitting element 130 are exposed from the lower surface 220*b* of the reflective resin layer 220, and the interconnect layer 180 is electrically connected to the electrodes 134 of the light-emitting element 130. The interconnect layer 180, when coupled to a power supply (not shown) or the like, has the function of supplying a predetermined current to each light-emitting element 130.

By providing the interconnect layer 180 on the lower surface 210*b* of the light guide plate 210, i.e., the back surface of the light-emitting module 200, the plurality of light-emitting elements 130 in the light-emitting module 200 can be electrically connected together by the interconnect layer 180, for example. With such a configuration, it is not necessary to separately form individual electrical connections between the plurality of light-emitting elements 130 and a wiring board. By connecting a power supply or the like to the interconnect layer 180, the electrical connections to the plurality of light-emitting elements 130 can be obtained all at once. Thus, in the light-emitting module according to an embodiment of the present disclosure, a power source, a driver circuit, etc., can be easily coupled to the light-emitting elements, and a desired operation can be easily achieved by connecting the power supply, driver circuit, etc., to the interconnect layer 180.

For example, the light-emitting elements 130 can be driven for each light-emitting module 200, i.e., on a module-by-module basis. As described below, a surface-emission light source may be constructed by combining a plurality of the light-emitting modules 200. In that case, the surface-emission light source can be caused to perform local dimming in which the individual light-emitting modules are individually driven. Of course, the light-emitting elements 130 may be driven in groups of one or more light-emitting cells 100U.

(Exemplary Production Method for Light-Emitting Module)

An exemplary production method for a light-emitting module according to an embodiment of the present disclosure will now be outlined.

Figure 8:
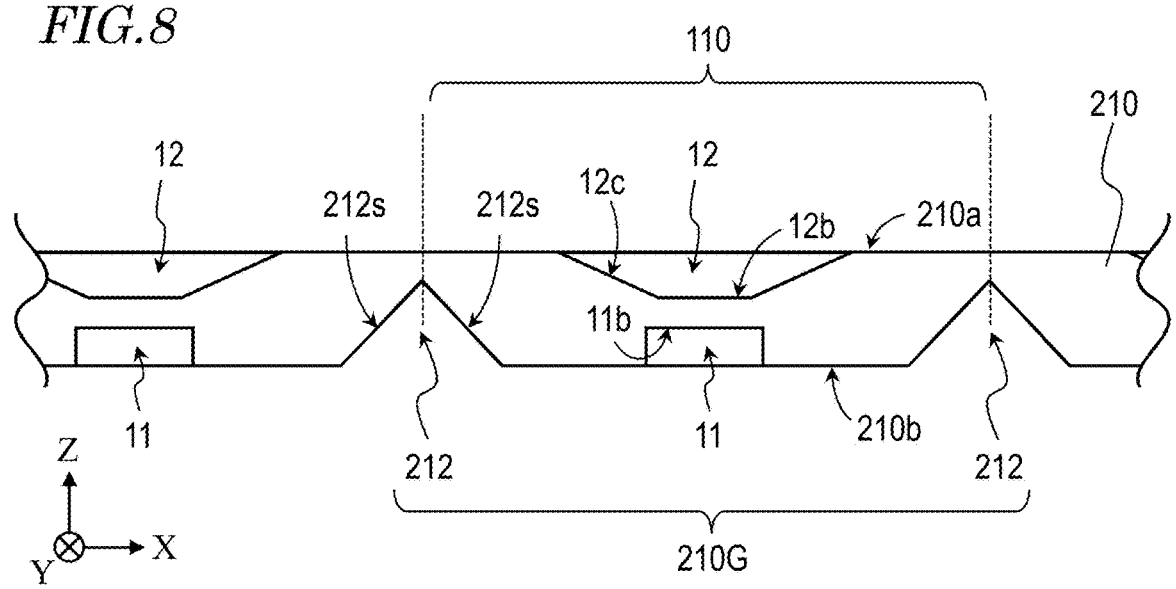
FIG. 8 is a schematic cross-sectional view for illustrating an exemplary production method for a light-emitting module according to an embodiment of the present disclosure.

Initially, as shown in FIG. 8, prepared is the light guide plate 210 having a plurality of (e.g., a two-dimensional array) the first recesses 11, and the grid-shaped groove portion 210G surrounding the first recesses 11, on one of the principal surfaces thereof. Note that although not shown in FIG. 8, outer edges of one of the principal surfaces of the light guide plate 210 has the grooves 214 that have about half the width of the grooves 212 defined by the two sloped surfaces 212*s* (see FIG. 3).

The light guide plate 210 can, for example, be formed by injection molding using a material that includes a polycarbonate as the base material. Of the materials described above, thermoplastic resin materials are preferable because the light guide plate 210 can be efficiently produced by injection molding. The light guide plate 210 may be formed by transfer molding, thermal transfer, etc., instead of injection molding.

In the example shown in FIG. 8, the light guide plate 210 has the plurality of second recesses 12 as the light diffusion structures on the upper surface 210*a* on the opposite side from the lower surface 210*b* on which the plurality of first recesses 11 are provided. Typically, each of the plurality of second recesses 12 is formed directly above a corresponding one of the plurality of first recesses 11 located on the lower surface 210*b*. Thus, here, the upper surface 210*a* of the light guide plate 210 has a two-dimensional array of the plurality of second recesses 12, and the bottom surface 12*b* of the second recess 12 on the upper surface 210*a* and the bottom surface 11*b* of the first recess 11 on the lower surface 210*b* are opposite each other. In the example shown in FIG. 8, it can be said that the light guide plate 210 is configured by a two-dimensional array of light guide plates 110, each of which is a unit structure having a first recess 11 and a second recess 12. The above groove 212 is located between two adjacent unit structures; in other words, between two adjacent light guide plates 110.

For example, when injection molding is applied to the structure that has recesses on each of the upper surface 210*a* and the lower surface 210*b* as shown in FIG. 8, such a structure can be obtained using a mold that has, at predetermined positions, protrusions protruding toward the inside of its cavity. Such a technique allows recesses to be formed on both the upper surface 210*a* and the lower surface 210*b* all at once, and therefore, the occurrence of misalignment between the recesses on the upper surface 210*a* and the recesses on the lower surface 210*b* can be substantially avoided.

Likewise, the grid-shaped groove portion 210G can be formed using a mold that has, at predetermined positions, a grid-shaped protrusion protruding toward the inside of its cavity. By using a protrusion protruding toward the inside of the cavity, that has a desired shape, a groove portion including a plurality of grooves, that has the desired shape, can be accurately formed. The technique of forming the groove portion 210G is not limited to the technique of forming the groove portion 210G together with the plurality of first recesses 11 and the plurality of second recesses 12 all at once. Alternatively, after obtaining the structure in which the first recesses 11 and the second recesses 12 are provided on the upper surface 210*a* and the lower surface 210*b*, respectively, the groove portion 210G is formed on the lower surface 210*b* by grooving or the like.

Figure 9:
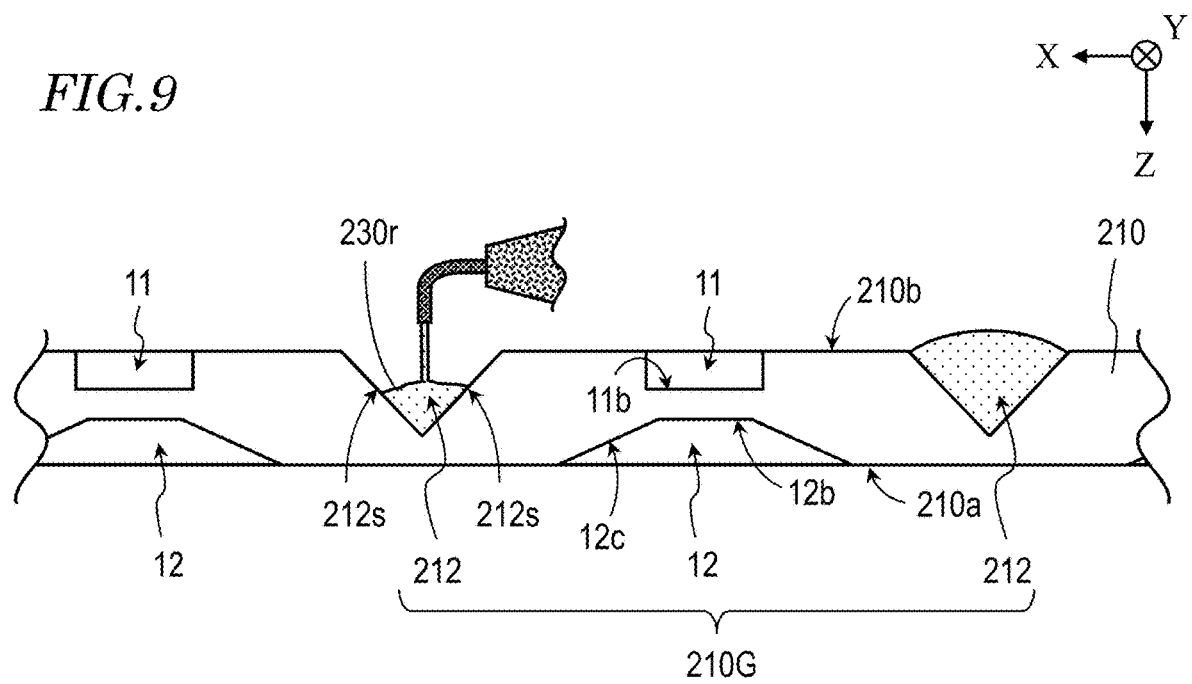
FIG. 9 is a schematic cross-sectional view for illustrating an exemplary production method for a light-emitting module according to an embodiment of the present disclosure.

Next, as schematically shown in FIG. 9, a resin composition 230r that contains, as a base material, for example, a light transmissive resin material having a refractive index lower than that of the light guide plate 210, is put into the groove portion 210G using a dispenser or the like. In the case where the base material of the light guide plate 210 is, for example, a polycarbonate, a silicone resin, etc., can be used as the base material of the resin composition 230r. By curing the resin composition 230r that has been put in the groove portion 210G, the first light transmission member 230 that has a shape fitting the shape of the groove portion 210G can be formed inside the groove portion 210G. Note that instead of putting the uncured resin composition 230r into the groove portion 210G, the first light transmission member 230 may be provided inside the groove portion 210G by disposing, inside the groove portion 210G, a grid-shaped member including a plurality of triangular prism-shaped segments each having light transmissivity.

Herein, next, a plurality of light emitter blocks each having a light-emitting element 130 and a wavelength conversion member 150 are prepared, and these light emitter blocks are disposed inside the plurality of first recesses 11. The light emitter block can, for example, be produced using the following procedure.

Figure 10:
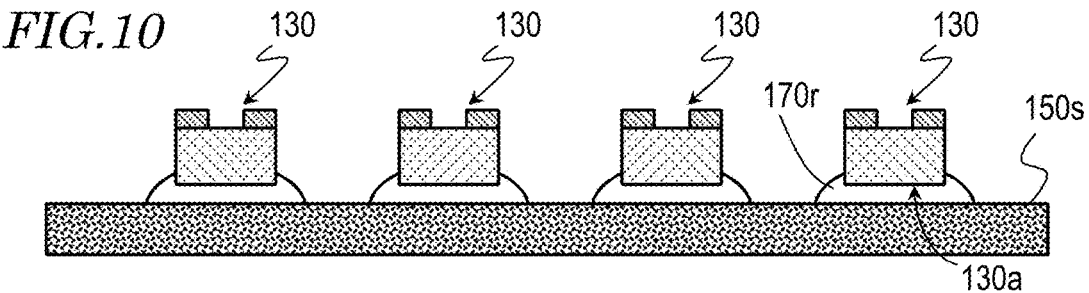
FIG. 10 is a schematic cross-sectional view for illustrating an exemplary production method for a light emitter block including a light-emitting device 130 as a part thereof.

Firstly, a phosphor sheet is formed using a resin composition in which a wavelength conversion material, such as particles of a phosphor, is dispersed, by injection molding, compression molding, transfer molding, or the like. The phosphor sheet may have a thickness of, for example, about 100 to 500 µm. Next, as shown in FIG. 10, a resin composition 170r containing a transparent resin material as a base material is applied to the phosphor sheet 150s using a dispenser or the like. Typically, at this time, the resin composition 170r may be applied to a plurality of regions of one of the principal surfaces of the phosphor sheet 150s. In addition, as shown in FIG. 10, a light-emitting element 130 is disposed on each region of the phosphor sheet 150s coated with the resin composition 170r with the upper surface 130a of the light-emitting element 130 positioned opposite the phosphor sheet 150s.

Figure 11:
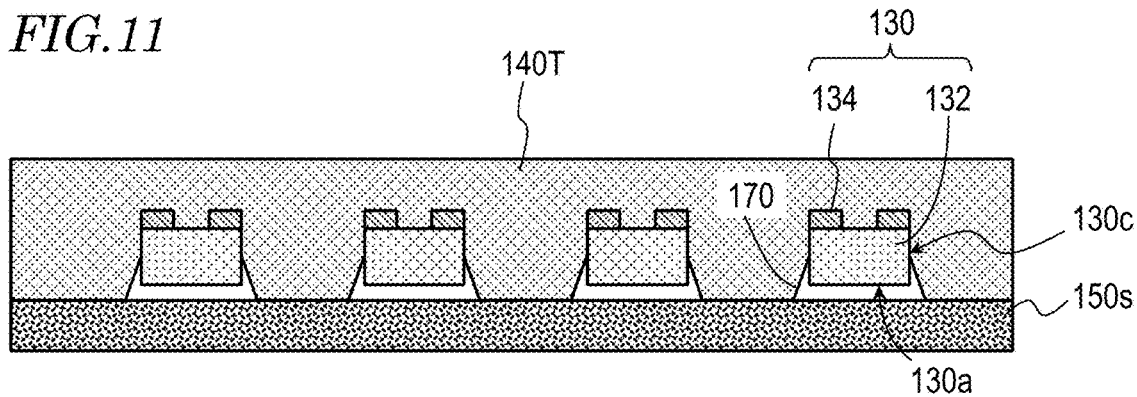
FIG. 11 is a schematic cross-sectional view for illustrating an exemplary production method for a light emitter block including a light-emitting device 130 as a part thereof.

Next, the resin composition 170r on the phosphor sheet 150s is cured. As shown in FIG. 11, the cured resin composition 170r forms the bonding member 170 that covers at least a portion of the lateral surface 130c of the light-emitting element 130. In addition, a resin composition containing a resin material as a base material and a light reflective filler is applied to the phosphor sheet 150s, and the resin composition on the phosphor sheet 150s is cured. As a result, a first resin layer 140T is formed that integrally covers the structures on the phosphor sheet 150s. The first resin layer 140T can be formed by various techniques, such as transfer molding, compression molding, spray application, printing, and potting.

Figure 12:
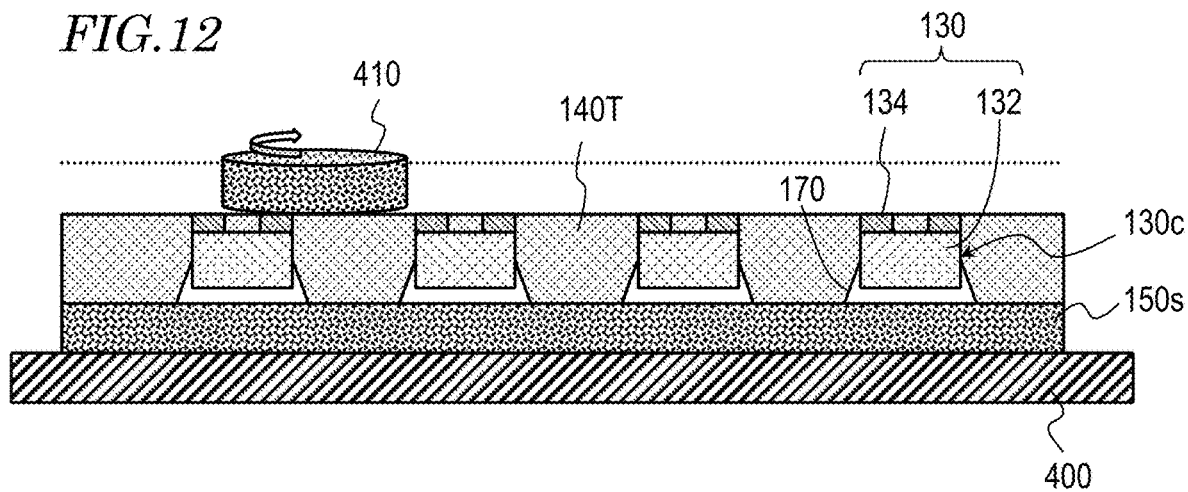
FIG. 12 is a schematic cross-sectional view for illustrating an exemplary production method for a light emitter block including a light-emitting device 130 as a part thereof.

As shown in FIG. 11, in the state that the first resin layer 140T is formed on the phosphor sheet 150s, the electrodes 134 of each light-emitting element 130 is typically covered by the first resin layer 140T. Herein, as shown in FIG. 12, the structure in which the first resin layer 140T is formed on the phosphor sheet 150s is disposed on a support 400, such as a heat-resistant adhesive tape, and a portion of the first resin layer 140T is removed from the opposite side from the phosphor sheet 150s by a grinding process using a grinder equipped with an abrasive wheel 410 or the like. As a result, the lower surfaces of the electrodes 134 of each light-emitting element 130 is exposed from the ground surface.

Figure 13:
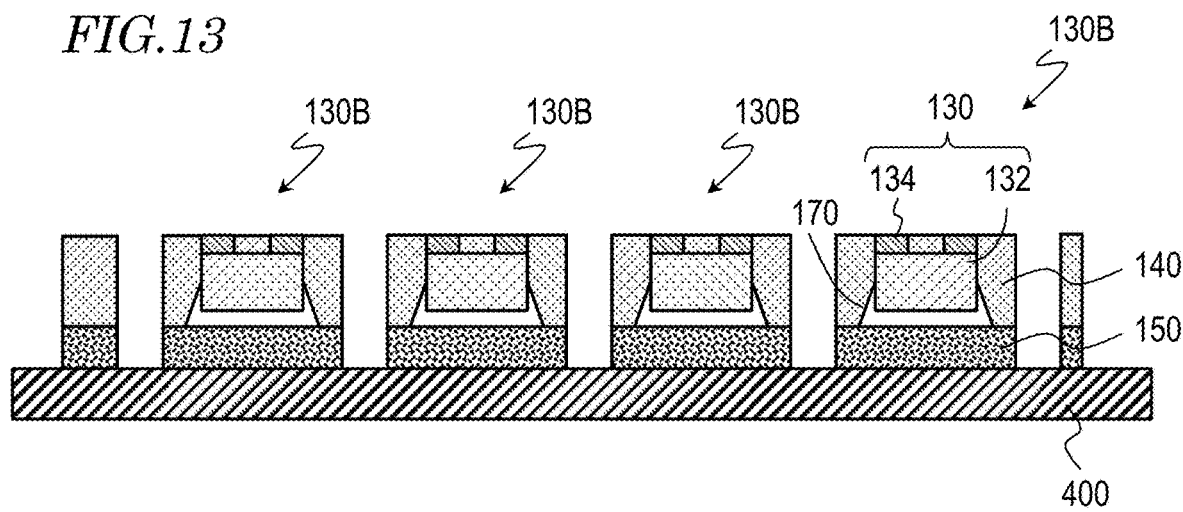
FIG. 13 is a schematic cross-sectional view for illustrating an exemplary production method for a light emitter block including a light-emitting device 130 as a part thereof.

Thereafter, the phosphor sheet 150s and the first resin layer 140T are cut, using a dicing device or the like, at a position between two adjacent light-emitting elements 130 on the phosphor sheet 150s. By this cutting step, a plurality of light emitter blocks 130B can be obtained in which the light reflective member 140 and the wavelength conversion member 150 are formed of the first resin layer 140T and the phosphor sheet 150s, respectively, and each of which, as shown in FIG. 13, has a light-emitting element 130 and a wavelength conversion member 150 covering the light-emitting element 130.

Figure 14:
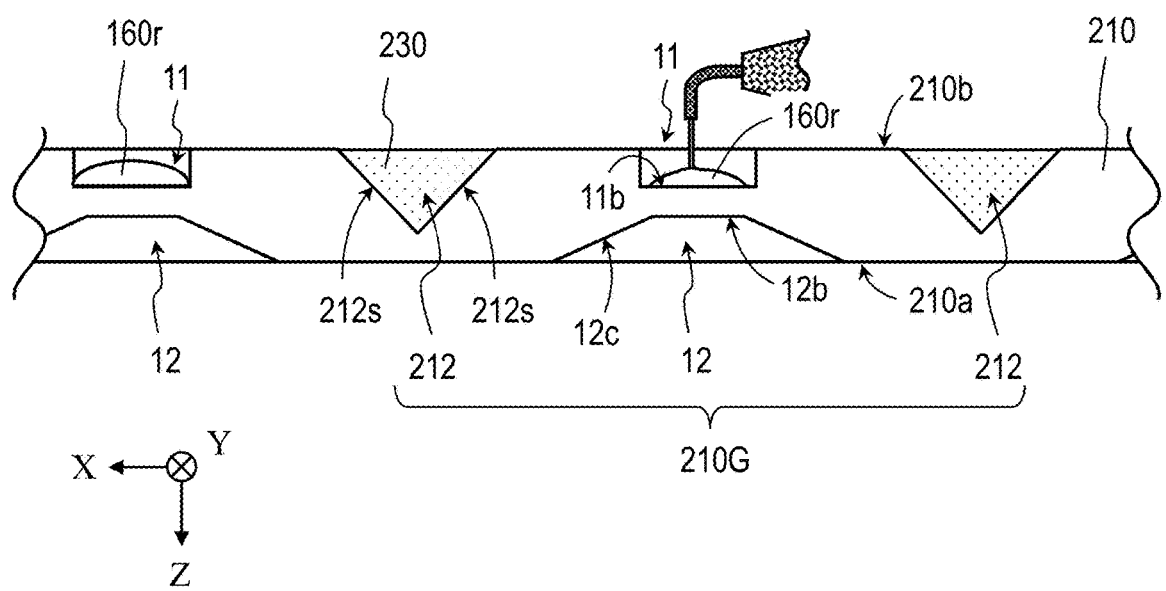
FIG. 14 is a schematic cross-sectional view for illustrating an exemplary production method for a light-emitting module according to an embodiment of the present disclosure.

Next, these light emitter blocks 130B are joined to the light guide plate 210. As shown in FIG. 14, in order to join the light emitter blocks 130B, a resin composition 160r is put into each of the plurality of first recesses 11 of the light guide plate 210 using a dispenser or the like. As with the material of the first light transmission member 230 or the material of the bonding member 170, the resin composition 160r may contain a transparent resin material as a base material. The resin composition 160r may be the same as the resin composition 230r for forming the first light transmission member 230. In the resin composition 160r, a material having a refractive index different from that of the base material may be dispersed.

After the resin composition 160r has been put into the first recesses 11, the above light emitter blocks 130B are disposed in the respective first recesses 11. At this time, as shown in FIG. 15, the light emitter block 130B is disposed in the first recess 11 so that the wavelength conversion member 150 of the light emitter block 130B is buried in the resin composition 160r, with the electrodes 134 of the light-emitting element 130 facing in the opposite direction from the light guide plate 210. Note that the light emitter block 130B does not need to be entirely buried below the lower surface 210b of the light guide plate 210.

In addition, in the state that the light emitter block 130B is inserted in the first recess 11, the surface of the resin composition 160r does not need to be a flat surface that is flush with the lower surface 210b of the light guide plate 210. For example, the resin composition 160r displaced by the light emitter block 130B may be raised from the lower surface 210b of the light guide plate 210, provided that the electrodes 134 of the light-emitting element 130 is not covered with the resin composition 160r. In the state that the light emitter block 130B is inserted in the first recess 11, the volume of a portion of the resin composition 160r that is located on the lower surface 210b of the light guide plate 210 can be controlled by adjusting the amount of the resin composition 160r put into the first recess 11.

Next, the resin composition 160r is cured. The cured resin composition 160r forms the second light transmission member 160. Each light-emitting element 130 can be secured inside a corresponding one of the plurality of first recesses 11 by the second light transmission member 160. In the case where the resin composition 160r is the same as the resin composition 230r that is the material of the first light transmission member 230, the resin composition 230r may be put into the groove portion 210G in the step of applying the resin composition 160r into the first recesses 11. By using a material common to the first light transmission member 230 and the second light transmission member 160, the resin composition 160r and the resin composition 230r can be concurrently cured, and therefore, the disposition of the light-emitting elements 130 inside the first recesses 11 and the formation of the first light transmission member 230 can be performed all at once.

Next, a resin composition in which, for example, a light reflective filler is dispersed is applied to the lower surface 210b of the light guide plate 210. Then, the applied resin composition is cured. As a result, as shown in FIG. 16, a second resin layer 220T that covers the lower surface 210b of the light guide plate 210, the first light transmission member 230, the light emitter blocks 130B, and the second light transmission member 160, is formed on the lower surface 210b of the light guide plate 210. The second resin layer 220T and the light reflective member 140 may share a common material. The second resin layer 220T can be formed using various techniques, such as transfer molding, compression molding, spray application, printing, and potting. At this stage, the electrodes 134 of each light-emitting element 130 may be covered by the second resin layer 220T.

Figure 17:
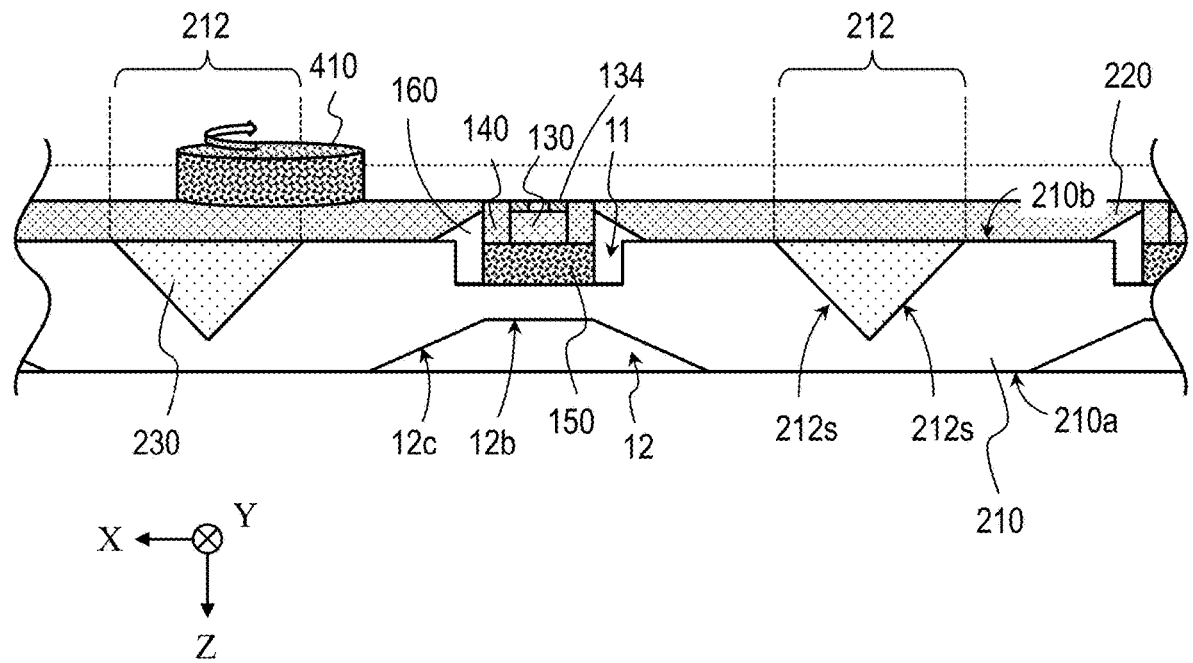
FIG. 17 is a schematic cross-sectional view for illustrating an exemplary production method for a light-emitting module according to an embodiment of the present disclosure.

After the formation of the second resin layer 220T, the lower surfaces of the electrodes 134 of the light-emitting element 130 located at a position corresponding to each of the plurality of first recesses 11 is exposed from the surface of the second resin layer 220T by a grinding process or the like. As a result, as schematically shown in FIG. 17, the reflective resin layer 220 can be formed of the second resin layer 220T. At this time, in order to substantially prevent light leakage from the lower surface 210b of the light guide plate 210, it is advantageous for the second light transmission member 160 to be entirely covered by the reflective resin layer 220 even in the state after the grinding.

Figure 18:
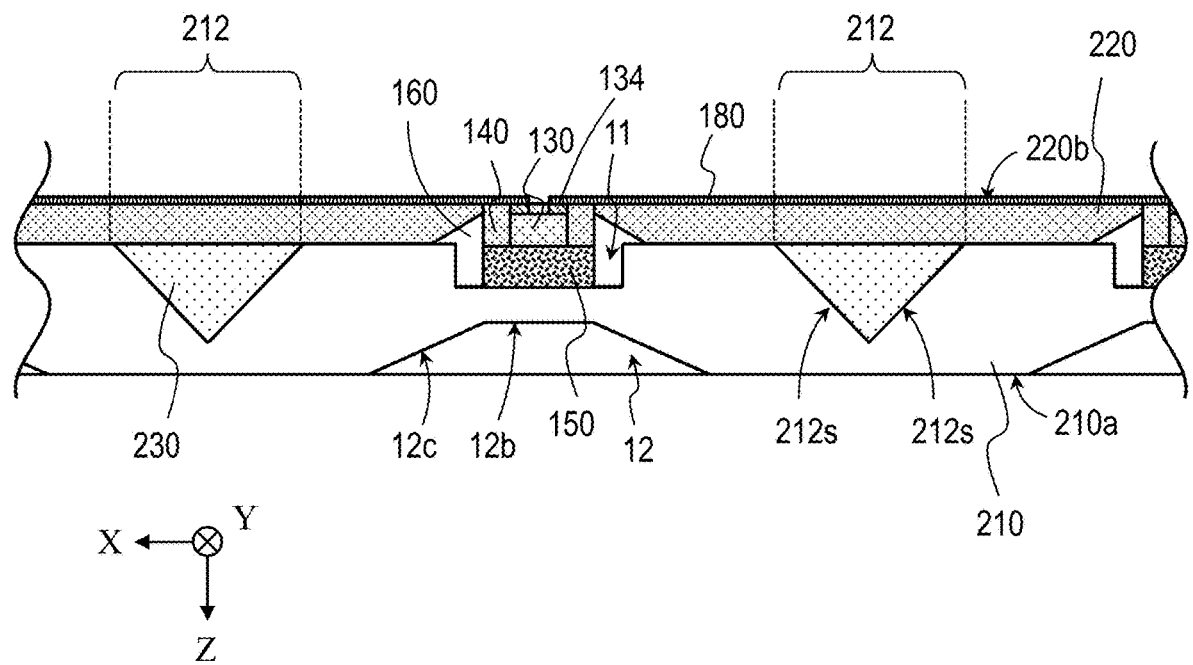
FIG. 18 is a schematic cross-sectional view for illustrating an exemplary production method for a light-emitting module according to an embodiment of the present disclosure.

Thereafter, optionally, as schematically shown in FIG. 18, the interconnect layer 180 is formed on the lower surface 220b of the reflective resin layer 220. The interconnect layer 180 can be formed, for example, after the formation of the reflective resin layer 220, by forming a metal film on the lower surface 220b of the reflective resin layer 220 by sputtering or the like, and patterning the metal film by, for example, laser abrasion. The metal film may be formed on the lower surface 220b of the reflective resin layer 220 in the form of a multilayer film. For example, the metal film may be formed on the lower surface 220b of the reflective resin layer 220 by successively depositing Cu, Ni, and Au.

By the above steps, the light-emitting module 200 shown in FIG. 1 can be obtained. Note that in the configuration illustrated in FIG. 8, the region of the upper surface 210a of the light guide plate 210, except for the second recesses 12, and the region of the lower surface 210b, except for the first recesses 11 and the groove portion 210G, are a generally flat surface. Note however that the shapes of the upper surface 210a and the lower surface 210b of the light guide plate 210 are not limited to this example. For example, a structure that diffuses or reflects light may be formed in a region excluding the second recesses 12, the first recesses 11, and the groove portion 210G. For example, minute irregularities may be provided in regions of the surfaces of the light guide plate 210, except for the second recesses 12, the first recesses 11, and the groove portion 210G, and the regions excluding the second recesses 12, the first recesses 11, and the groove portion 210G may be a rough surface.

As can be seen from the illustrative production steps described above, in this embodiment, the light-emitting element 130 is previously secured on the light guide plate 210, instead of the wiring board, and therefore, misalignment between the light-emitting element 130 and the light diffusion structure on the upper surface 210a of the light guide plate 210 can be substantially prevented. Note that the plurality of light-emitting cells 100U included in the light-emitting module 200 typically share a common structure. However, it is not essential in embodiments of the present disclosure that the light-emitting module be constructed only of a plurality of light-emitting cells sharing a common structure. For example, the depths of the grooves located on the lower surface 210b of the light guide plate 210 may be different between 4 of the 16 light-emitting cells 100U arranged in a matrix of 4 rows and 4 columns, that are located at a central portion of the light emission surface, and the remaining 12 light emitting cells located at an outer peripheral portion surrounding the four light-emitting cells. Alternatively, the configurations of the light diffusion structures, e.g. the sizes of the recesses 12, may be different between one or more light-emitting cells located at a central portion of the light emission surface and a plurality of light-emitting cells located in an outer peripheral portion.

(Embodiment of Surface-Emission Light Source)

Figure 19:
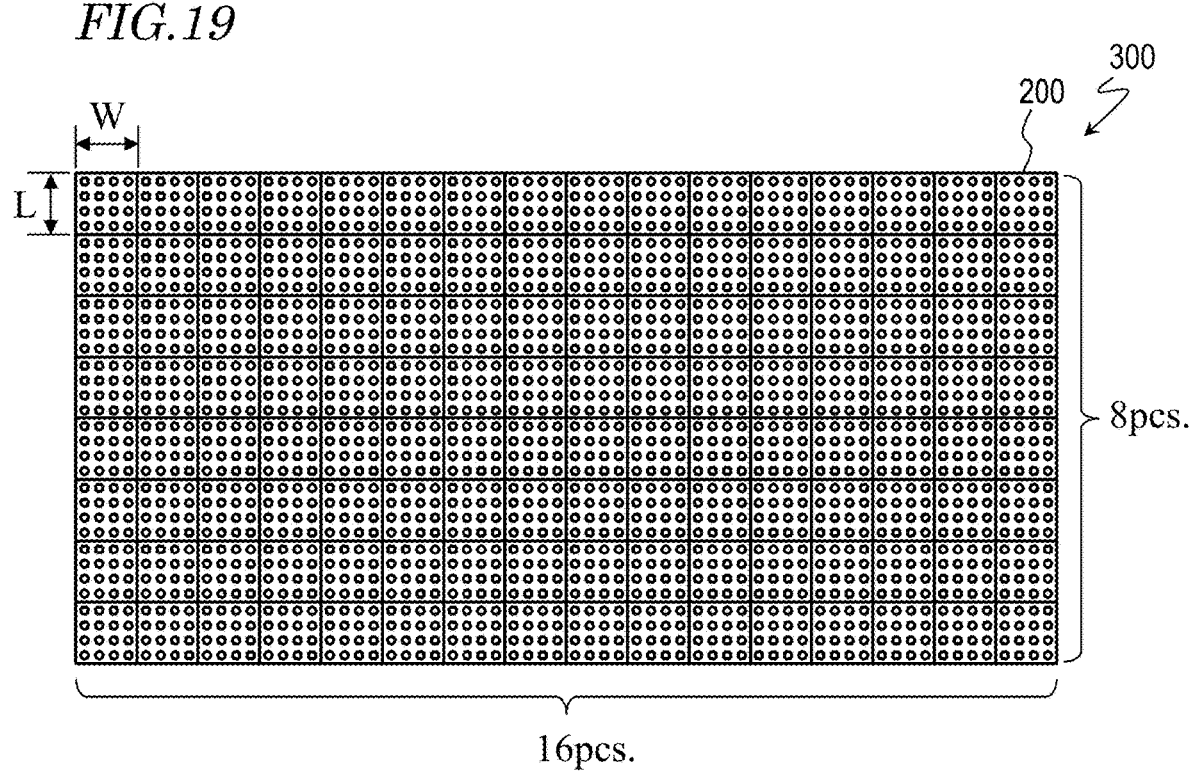
FIG. 19 is a schematic plan view showing an exemplary configuration of a surface-emission light source according to another embodiment of the present disclosure.

FIG. 19 shows an example of a surface-emission light source according to another embodiment of the present disclosure. The surface-emission light source 300 of FIG. 19 includes a two-dimensional array of the light-emitting modules 200. FIG. 19 schematically shows an exemplary arrangement of the light-emitting modules 200 in a matrix of 8 rows and 16 columns, and shows an appearance of the two-dimensional array of light-emitting modules 200 as viewed from above the upper surface 210a of the light guide plate 210.

The light guide plates 210 of two light-emitting modules 200 adjacent to each other in the row or column direction are typically in direct contact with each other. However, it is not essential that the two-dimensional array be formed so that the light guide plates 210 of two adjacent light-emitting modules 200 are in direct contact with each other. A light guide structure that optically couples light guide plates together may be interposed between two adjacent light guide plates 210. For example, such a light guide structure can be formed by applying a light transmissive adhesive to the lateral surfaces of the light guide plates 210, and then curing the applied adhesive. Alternatively, a light guide structure may be formed by two-dimensionally disposing a plurality of light-emitting modules 200 apart from each other, filling a region between two adjacent light guide plates 210 with a light transmissive resin material, and then curing the resin material. A material for the light guide structure located between the light guide plates 210 may be similar to that for the above bonding member 170. A material having a refractive index that is similar to or greater than that of a material for the light guide plate 210 can be advantageously used as the base material of the light guide structure. The light guide structure located between the light guide plates 210 may have a light diffusion function.

In the example shown in FIG. 19, the length L in the lengthwise direction and the length W in the widthwise direction of each light-emitting module 200 are, for example, about 24.3 mm and about 21.5 mm, respectively. Therefore, the array of light-emitting modules 200 shown in FIG. 19 is suitable for a 15.6-inch screen size with an aspect ratio of 16:9. For example, the array of light-emitting modules 200 shown in FIG. 19 can be suitably used in a backlight unit of a laptop computer having a 15.6-inch screen size.

According to an embodiment of the present disclosure, a set of the upper surfaces 210a of the light guide plates 210, which are the upper surfaces of the light-emitting modules 200, forms a light emission surface. Therefore, the light emission surface can have a large area. In addition, by changing the arrangement of the light-emitting modules 200 or changing the number of the light-emitting modules 200 included in the surface-emission light source 300, the surface-emission light source 300 can be easily applied to various kinds of liquid-crystal panels having different screen sizes. That is, there is no need to perform optical calculations again for the light guide plate 210, etc., of the light-emitting module 200, or to produce a mold for forming the light guide plate 210 again, and therefore, the surface-emission light source 300 is easily adaptable to changes in screen size. Therefore, changing the screen size will not lead to an increase in manufacturing cost and lead time.

Figure 20:
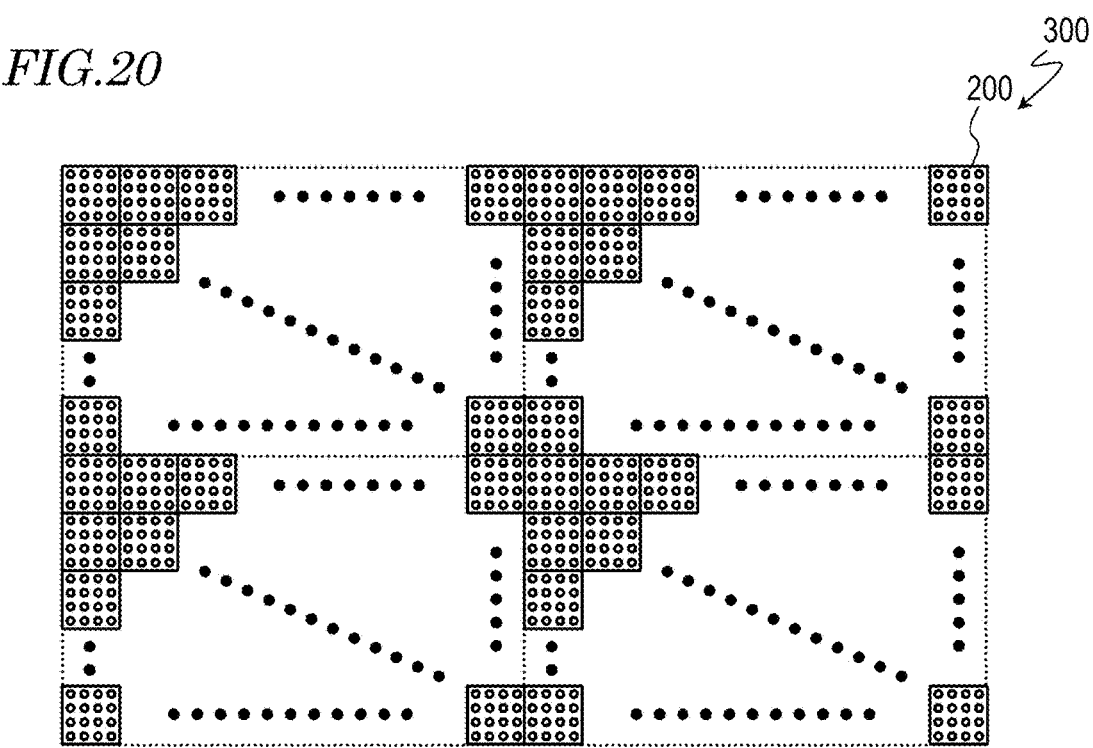
FIG. 20 is a plan view schematically showing a configuration in which a plurality of the surface-emission light sources of FIG. 19 are arranged in a matrix of two rows and two columns.

FIG. 20 shows a configuration in which a plurality of the surface-emission light sources 300 of FIG. 19 are arranged in a matrix of two rows and two columns. In this case, a total of 512 light-emitting modules 200 together form a surface light source that is suitable for a 31.2-inch screen size with an aspect ratio of 16:9. For example, the array of light-emitting modules 200 shown in FIG. 20 may be used in a backlight unit of a liquid-crystal television, etc. Thus, according to this embodiment, it is relatively easy to obtain a larger-area light emission surface.

According to the technique of forming the light emission surface of the surface-emission light source 300 by a combination of a plurality of the light-emitting modules 200, there is no need to design the optical system again or to produce a mold for forming a light guide plate again for a different screen size. Therefore, this technique is easily adaptable to liquid-crystal panels of various screen sizes. That is, a backlight unit that is suitable for a screen size can be made available at low cost and in a short lead time. Another advantage is that even if the surface-emission light source 300 includes a light-emitting element that cannot be lit due to a breaking of wire or the like, the surface-emission light source 300 can be readily restored by replacing a light-emitting module including the defective light-emitting element with another light-emitting module.

(Electrical Connection between Light-Emitting Modules 200) As described above with reference to FIG. 2, etc., the interconnect layer 180 that has electrical connections to light-emitting elements in light-emitting cells may be provided on the lower surface 220b of the light reflective member 220. With such a configuration, by connecting a power supply or the like to the interconnect layer 180, an electrical connection can be easily established between the light-emitting elements in the light-emitting modules 200 and the power supply or the like. That is, surface emission can be easily achieved by connecting a power supply to the interconnect layer 180.

Figure 21:
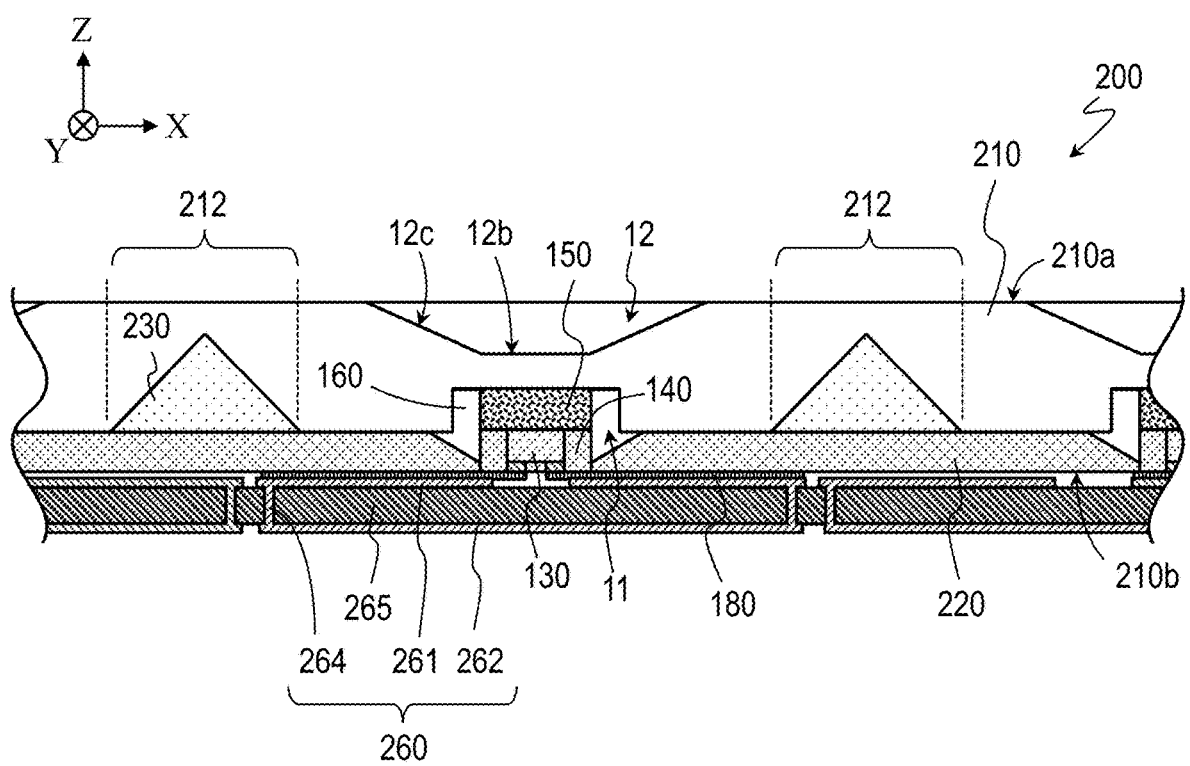
FIG. 21 is a schematic cross-sectional view showing an exemplary state that a light-emitting module 200 is connected to a wiring board 260.

FIG. 21 shows an exemplary state that the light-emitting module 200 is connected to a wiring board. In an embodiment, as shown in FIG. 21, the light-emitting module of the present disclosure may have a wiring board 260. In the configuration illustrated in FIG. 21, the wiring board 260 includes an insulating base 265, a first interconnect layer 261 and a second interconnect layer 262 on the insulating base 265, and a plurality of vias 264. The first interconnect layer 261 is provided on one of the principal surfaces of the insulating base 265, and the second interconnect layer 262 is located on the other principal surface of the insulating base 265. The first interconnect layer 261 and the second interconnect layer 262 are electrically connected to each other through the vias 264 disposed in the insulating base 265.

The wiring board 260 is arranged on the lower surface side of the light-emitting module 200, i.e., on the opposite side from the upper surface 210a of the light guide plate 210, and the first interconnect layer 261 faces the interconnect layer 180 of the light-emitting module 200. The light-emitting module 200 is mounted on the wiring board 260 by joining the interconnect layer 180 to the first interconnect layer 261 of the wiring board 260 by solder or the like. According to this embodiment, the interconnect layer 180 having connections to the light-emitting elements may be provided on the light-emitting module 200, and therefore, connections that are required for local dimming etc., may be easily formed without forming a complicated wiring pattern on the wiring board 260. Because the interconnect layer 180 may have a larger area than that of the lower surface of the electrode 134 of each light-emitting element, it is relatively easy to form an electrical connection to the first interconnect layer 261. Alternatively, for example, in the case where the light-emitting module 200 does not include the interconnect layer 180, the electrodes of the light-emitting element may be connected to the first interconnect layer 261 of the wiring board 260.

Figure 22:
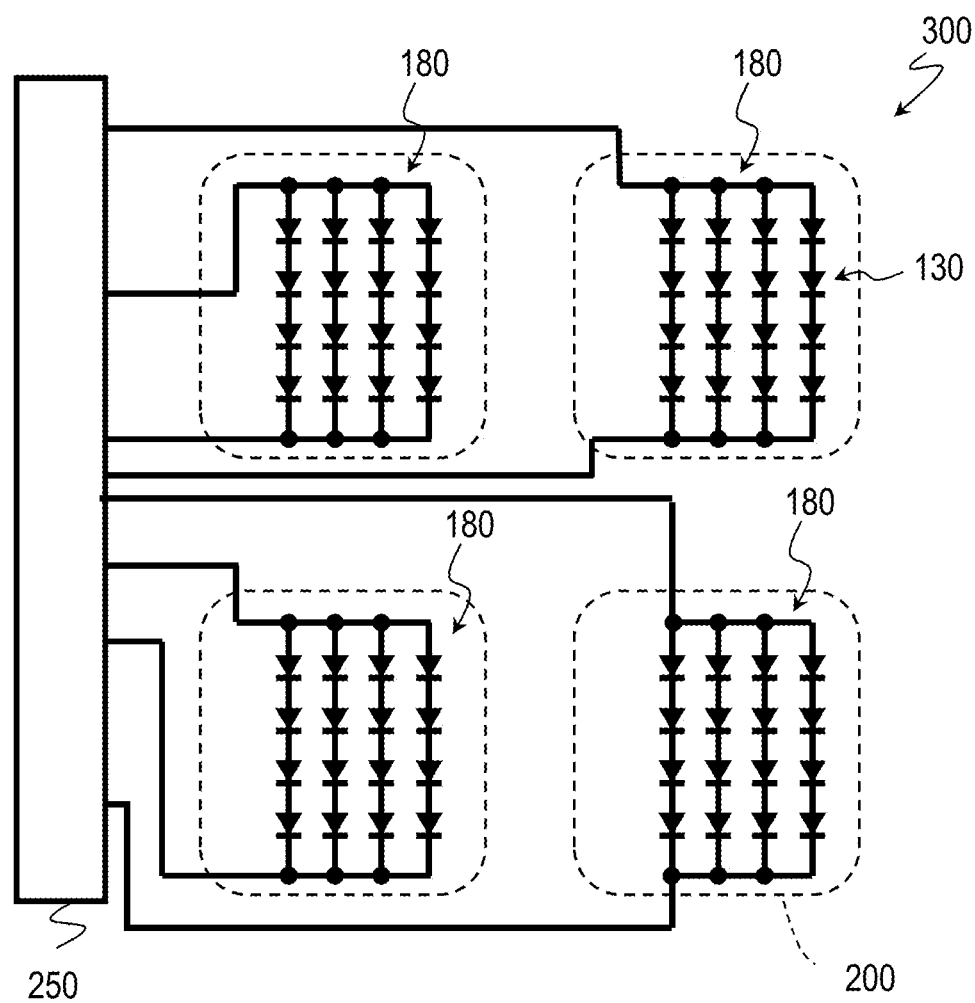
FIG. 22 is a schematic circuit diagram showing an example of a wiring pattern of an interconnect layer 180.

FIG. 22 shows an example of a wiring pattern of the interconnect layer 180. For the sake of simplicity, FIG. 22 schematically shows electrical connections in four of a plurality of light-emitting modules 200 that may be included in the surface-emission light source 300.

The surface-emission light source 300 includes an interconnect layer 180 for each light-emitting module 200. The interconnect layer 180 of each light-emitting module 200 electrically connects together a plurality of light-emitting elements 130 included in that light-emitting module 200. In the example shown in FIG. 22, the interconnect layer 180 of each light-emitting module 200 includes four groups of four serially-connected light-emitting elements 130, the four groups being connected together in parallel.

As shown in FIG. 22, the interconnect layers 180 may each be connected to a driver 250 for driving the light-emitting elements 130. The driver 250 may be disposed on a substrate or the like (e.g., the wiring board 260) that supports the light-emitting modules, and may be electrically connected to the interconnect layers 180. Alternatively, the driver 250 may be disposed on a substrate that is separate from the substrate that supports the light emitting modules, and may be electrically connected to the interconnect layers 180. With such a circuit configuration, local dimming may be performed for each light-emitting module 200 including 16 light-emitting elements 130, i.e., on a module-by-module basis. Needless to say, the connection between the light-emitting elements 130 by the interconnect layer 180 is not limited to the example shown in FIG. 22, and may be made so that the light-emitting elements 130 in the light-emitting module 200 are driven separately. Alternatively, the light-emitting elements 130 included in the light-emitting module 200 may be divided into a plurality of groups, and the light-emitting elements 130 may be electrically connected together so that the light-emitting elements 130 can be driven in groups of light emitting elements 130.

As described above, according to the embodiments of the present disclosure, a light source device can be provided that has a further reduced thickness and is easily adaptable to various screen sizes. Note that in each of the foregoing embodiments, the array of the light-emitting elements 130 and the array of the light-emitting modules 200 are merely illustrative. For example, the number and arrangement of the light-emitting modules 200 in the surface-emission light source 300 are not particularly limited. The foregoing embodiments are merely illustrative, and can be used in various combinations unless a technical contradiction occurs.

The embodiments of the present disclosure are useful for various types of light sources for lighting, in-vehicle light sources, light sources for displays, etc. In particular, the embodiments of the present disclosure are advantageously applicable to backlight units for liquid-crystal display devices. A light-emitting device according to an embodiment of the present disclosure may be suitably used in a backlight for the display devices of mobile devices which heavily require a reduction in thickness, surface-emission devices on which local dimming control can be performed, etc.

While the present invention has been described with respect to exemplary embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

What is claimed is:

1. A light-emitting module comprising:
   a light guide plate having a first surface on which a plurality of first recesses arranged in rows and columns and a grid-shaped groove portion surrounding each of the plurality of first recesses are provided, and a second surface located on an opposite side from the first surface;
   a plurality of light-emitting elements each disposed inside a corresponding one of the plurality of first recesses of the light guide plate;
   a first light transmission member disposed inside the groove portion of the light guide plate, and having a refractive index lower than a refractive index of the light guide plate; and
   a reflective resin layer covering the first surface of the light guide plate and the first light transmission member,
   wherein the first light transmission member comprises a resin material.

2. The light-emitting module according to claim 1, wherein
   the second surface of the light guide plate has a plurality of light diffusion structures, and
   each of the plurality of light diffusion structures is arranged on an opposite side from a corresponding one of the plurality of first recesses.

3. The light-emitting module according to claim 2, wherein
   each of the plurality of light diffusion structures is a second recess.

4. The light-emitting module according to claim 1, wherein
   the groove portion includes a plurality of sloped surfaces extending in the rows and the columns.

5. The light-emitting module according to claim 2, wherein
   the groove portion includes a plurality of sloped surfaces extending in the rows and the columns.

6. The light-emitting module according to claim 3, wherein
   the groove portion includes a plurality of sloped surfaces extending in the rows and the columns.

7. The light-emitting module according to claim 1, wherein
   the groove portion is a set of round grooves extending in the rows and the columns.

8. The light-emitting module according to claim 2, wherein
   the groove portion is a set of round grooves extending in the rows and the columns.

9. The light-emitting module according to claim 3, wherein
   the groove portion is a set of round grooves extending in the rows and the columns.

10. The light-emitting module according to claim 1, wherein
    each of the plurality of first recesses has a bottom surface and one or more lateral surfaces,
    each of the plurality of light-emitting elements has an upper surface and an electrode located on an opposite side from the upper surface,
    the light-emitting module further comprises:
       a wavelength conversion member disposed between the bottom surface of each of the plurality of first recesses and the upper surface of a corresponding one of the plurality of light-emitting elements; and
       a light reflective member covering a lateral surface of the light-emitting element inside each of the plurality of first recesses, and
    a lower surface of the electrode of each of the plurality of light-emitting elements is exposed from the light reflective member.

11. The light-emitting module according to claim 2, wherein
    each of the plurality of first recesses has a bottom surface and one or more lateral surfaces,
    each of the plurality of light-emitting elements has an upper surface and an electrode located on an opposite side from the upper surface,
    the light-emitting module further comprises:
       a wavelength conversion member disposed between the bottom surface of each of the plurality of first recesses and the upper surface of a corresponding one of the plurality of light-emitting elements; and
       a light reflective member covering a lateral surface of the light-emitting element inside each of the plurality of first recesses, and
    a lower surface of the electrode of each of the plurality of light-emitting elements is exposed from the light reflective member.

12. The light-emitting module according to claim 3, wherein
    each of the plurality of first recesses has a bottom surface and one or more lateral surfaces,
    each of the plurality of light-emitting elements has an upper surface and an electrode located on an opposite side from the upper surface,
    the light-emitting module further comprises:
       a wavelength conversion member disposed between the bottom surface of each of the plurality of first recesses and the upper surface of a corresponding one of the plurality of light-emitting elements; and
       a light reflective member covering a lateral surface of the light-emitting element inside each of the plurality of first recesses, and
    a lower surface of the electrode of each of the plurality of light-emitting elements is exposed from the light reflective member.

13. The light-emitting module according to claim 10, further comprising:
    a plurality of second light transmission members, a portion of each of the plurality of second light transmission members being located inside a corresponding one of the plurality of first recesses,
    wherein
    each wavelength conversion member is held on the bottom surface of each of the plurality of first recesses by a corresponding one of the plurality of second light transmission members.

14. The light-emitting module according to claim 13, wherein the reflective resin layer further covers the plurality of second light transmission members.

15. The light-emitting module according to claim 1, wherein
the light guide plate has a rectangular outer shape as seen in a plan view.

16. The light-emitting module according to claim 2, wherein
the light guide plate has a rectangular outer shape as seen in a plan view.

17. The light-emitting module according to claim 3, wherein
the light guide plate has a rectangular outer shape as seen in a plan view.

18. A surface-emission light source comprising:
a plurality of the light-emitting modules according to claim 1,
wherein
the plurality of the light-emitting modules are arranged in a two-dimensional array.

19. A surface-emission light source comprising:
a plurality of the light-emitting modules according to claim 2,
wherein
the plurality of the light-emitting modules are arranged in a two-dimensional array.

20. A surface-emission light source comprising:
a plurality of the light-emitting modules according to claim 3,
wherein
the plurality of the light-emitting modules are arranged in a two-dimensional array.

* * * * *